(12) United States Patent
Smith

(10) Patent No.: US 11,767,941 B2
(45) Date of Patent: Sep. 26, 2023

(54) APPARATUS FOR HYDROSTATIC TESTING USING POWER FROM AND ROV

(71) Applicant: Pressure Technologies LLC, Metairie, LA (US)

(72) Inventor: Randall M Smith, Metairie, LA (US)

( * ) Notice: Subject to any disclaimer, the term of this patent is extended or adjusted under 35 U.S.C. 154(b) by 0 days.

(21) Appl. No.: 17/382,316

(22) Filed: Jul. 21, 2021

(65) Prior Publication Data

US 2021/0348704 A1 Nov. 11, 2021

Related U.S. Application Data

(63) Continuation-in-part of application No. 16/563,521, filed on Sep. 6, 2019, now Pat. No. 11,099,097.

(51) Int. Cl.

| F16L 23/00 | (2006.01) |
| F16L 23/16 | (2006.01) |
| F16L 23/028 | (2006.01) |
| B63G 8/00 | (2006.01) |
| F16L 23/032 | (2006.01) |

(52) U.S. Cl.
CPC ............ *F16L 23/006* (2013.01); *B63G 8/001* (2013.01); *F16L 23/028* (2013.01); *F16L 23/032* (2013.01); *F16L 23/16* (2013.01); *B63G 2008/005* (2013.01)

(58) Field of Classification Search
CPC ..... F16L 23/006; F16L 23/028; F16L 23/032; F16L 23/16; B63G 8/001; B63G 2008/005
USPC ........................ 114/313; 138/90, 94; 166/337
See application file for complete search history.

(56) References Cited

U.S. PATENT DOCUMENTS

| 4,483,206 A * | 11/1984 | Thompson | ............. B01J 8/0015 73/863.85 |
| 5,141,125 A * | 8/1992 | Canty | ...................... B01J 3/004 |
| 5,188,483 A * | 2/1993 | Kopp | ........................ F16L 1/20 166/338 |

* cited by examiner

*Primary Examiner* — Greg Binda
(74) *Attorney, Agent, or Firm* — Henry E Naylor

(57) ABSTRACT

Apparatus for hydrostatic testing of items having a flanged opening, such as flanged pipe sections, which apparatus contains a actuator having a actuator shaft attached to a blind flange, which actuator can be powered from a power source on a remotely operated vehicle, which items include those items located on land as well as subsea. Also provided is a remotely operated vehicle having a power source such as a hydraulic system that is used to operate the actuator on the hydrostatic testing apparatus.

16 Claims, 21 Drawing Sheets

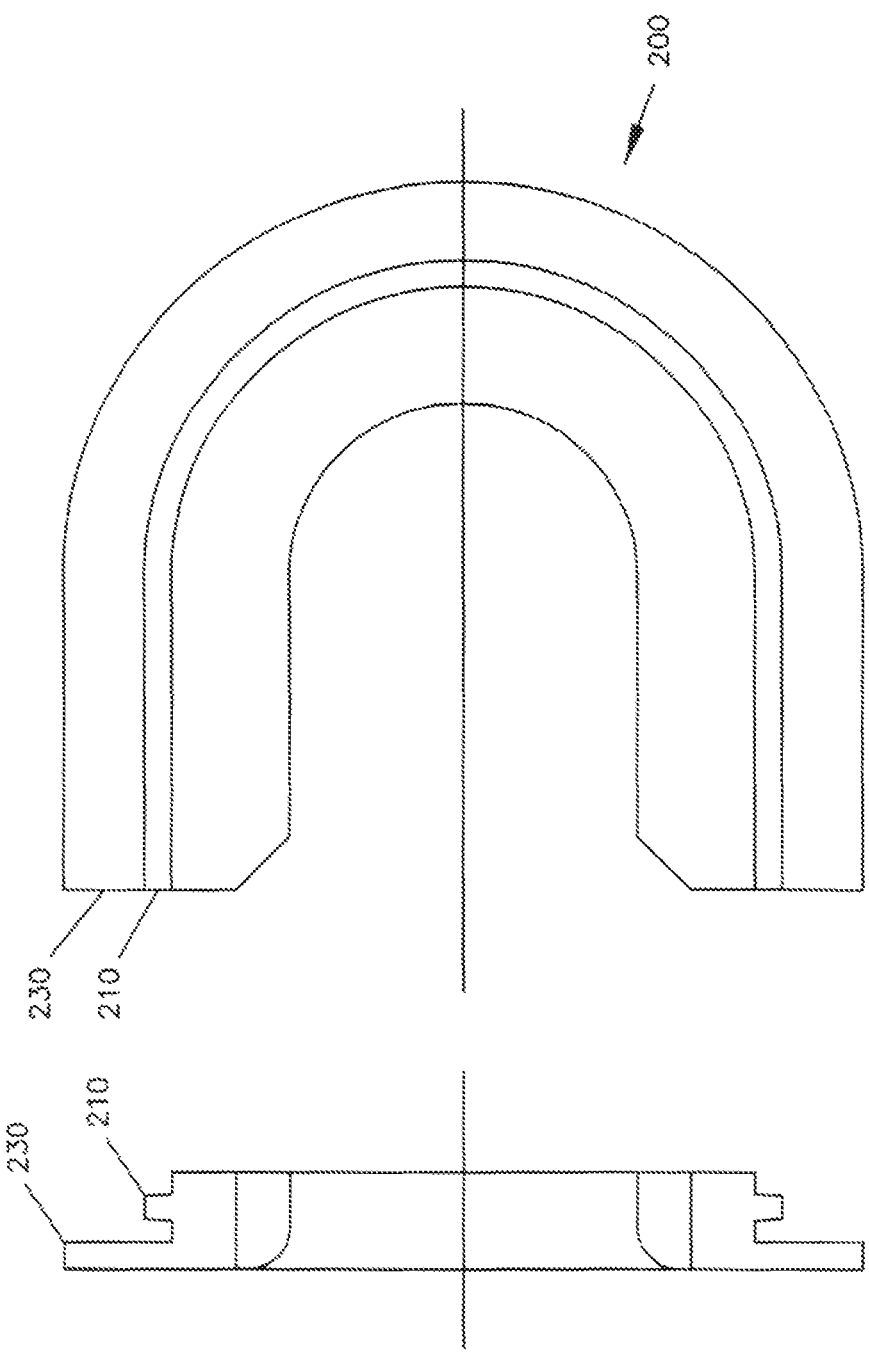

APPARATUS FOR HYDROSTATIC TESTING USING POWER FROM AND ROV

FIELD OF THE INVENTION

This invention relates to apparatus for hydrostatic testing of items having a flanged opening, such as flanged pipe sections, which apparatus contains a actuator having a actuator shaft attached to a blind flange, which actuator can be powered from a power source on a remotely operated vehicle, which items include those items located on land as well as subsea.

BACKGROUND OF THE INVENTION

In most industrialized areas of the world, vast quantities of fluids are transported, stored, handled, and processed through flanged conduits and related equipment such as flanged pipelines, flanged piping, flanged hose assemblies, flanged pressure vessels, flanged heat exchangers, flanged pumps, etc. Non-limiting examples of fluids that are transported through flanged conduits and equipment include crude oils, lubricating oils, natural gas, refined products such as transportation fuels, as well as a variety of petrochemical feedstock and product streams, industrial gases, food products, pharmaceuticals, etc. Further, such flanged conduits are often of considerable length and can extend for many miles over all types of geographic terrain, as well as subsea.

A substantial fraction of pipelines and other associated flanged items and equipment is located underneath bodies of water including fresh water, seawater, and brackish water environments. There are two main categories of pipelines used to transport energy products: petroleum pipelines and natural gas pipelines. Petroleum pipelines transport primarily crude oil and natural gas liquids. There are three main types of petroleum pipelines involved in this process. These are: i) gathering pipeline systems; ii) crude oil and/or natural gas pipeline systems, and iii) refined product pipeline systems. Gathering pipeline systems gather crude oil, natural gas, natural gas liquids/condensates, from production wells and conduct them downstream to processing facilities, refining or bulk. There are also tens of thousands of miles of relatively small pipelines, piping networks, flowlines, etc. in the architecture of subsea and/or surface gas and oil production and gathering facilities that are not considered as pipelines for the transportation of such products, but nevertheless incorporate flanged connections.

Many of these pipelines, process equipment, and related piping in use today are continuously filled with valuable and potentially hazardous fluids. Some of these fluids can be lethal, explosive, highly flammable, or highly reactive at certain high pressures and temperature combinations. Consequently, sections of traditional piping, including piping manufactured for use for these pipelines, as well as related flanged equipment, such as pressure vessels, heat exchangers, and pumps, etc. are required to undergo both initial testing at the time of fabrication, alteration, or repairs as well subject to periodic hydrostatic testing. Hydrostatic testing is conventionally performed under constraints dictated by the specific industry, piping system or pressure vessel Code, to which it is designed, as well as to constraints that are required by the customer and various governing bodies, including in some instances sound engineering judgment. One such specification that is required is that both the pressure and physical integrity of the flanged piping and/or pipeline and related flanged equipment is ensured for their intended purpose before being placed into service as well as throughout its intended use and commercial lifetime.

Hydrostatic testing generally requires that each end of a flanged item to be tested is sealed against an applied testing pressure without leaking during the duration of the test. The flanged item to be tested is typically filled with a liquid under pressure, generally water, or in some instances an inert gas, such as nitrogen. Conventionally, a blind flange of the testing apparatus is bolted onto the flange at each end of the flanged item to be tested. The connecting flanges are then typically bolted together using code required torque sequences of the bolting to ensure that at least one sealing gasket between flanges is fully energized and capable of resisting the hydrostatic pressure during testing and any applied external loads. Depending on the size of the flange and the selected pressure, from about four to dozens of bolts per set of flanges can be required. Securing and torquing these bolts is an extremely laborious, repetitive, and time-consuming process that can take up to several hours to one or more days to simply prepare a single flanged connection for hydrostatic testing. Additionally, the bolting and gasket cannot be re-used and must be discarded after each use owing to elongation of the bolting and permanent damage to the gasket, which is a costly endeavor. Therefore, there is a need in the art for hydrostatic testing apparatus that will substantially reduce the time and costs of performing hydrostatic testing, and reduce waste.

SUMMARY OF THE INVENTION

The present invention relates to apparatus suitable for providing two important services to a subsea structure located on the seafloor, which subsea structure is typically put in place by the oil and gas industry as part of their extensive underwater pipeline systems which are typically used to transport oil and gas from production wells to storage and processing facilities located on land. One important service this invention provides is the positioning of a blind flange on a flanged opening on such subsea structures, and the other is to perform hydrostatic testing of a section of pipeline associated with a subsea structure. Thus, the instantly claimed invention contains two primary pieces of apparatus. One piece of apparatus is the hydrostatic testing apparatus which also contains a blind flange that can be positioned on the flange of the flanged opening to be sealed, or it can be used for hydrotesting. The hydrotesting apparatus of the present invention is illustrated in detail in FIGS. 1 to 19 herein. Such a hydrostatic apparatus is also taught and claimed in U.S. Pat. No. 10,428,981 issued on Oct. 1, 2019 and U.S. Pat. No. 10,697,848 issued on Jun. 30, 2020, both of which were allowed by the instant examiner. The other piece of apparatus is a remotely operated vehicle (ROV) having hydraulic power on board. Non-limiting examples of subsea structures suitable for this invention include: a pipeline end termination (PLET) structure, a pipeline end termination manifold (PLEM), and a flowline end termination (FLET) structure. The ROV is positioned underwater at the vicinity of a subsea structure resting on the sea floor, which subsea structure contains a flanged opening to be sealed with a blind flange, or which requires hydrotesting to be performed on an associated flanged pipeline section. For purposes of this invention, it is preferred that power used to activate the actuator of said hydrotesting apparatus is hydraulic power which can be shared with an ROV having hydraulic power or a subsea structure which will typically have power via an umbilical cable containing one or more power sources from the surface.

BRIEF DESCRIPTION OF THE FIGURES

FIG. 2 hereof is an elevated perspective view of the rear face of the preferred embodiment of the instant apparatus as illustrated in FIG. 1 hereof showing blind flange 16 having an O-ring 34 partially embedded in a corresponding annular groove, which O-ring is capable of establishing a substantially leak-proof pressure-seal when pressed against the flange of a flanged item to be tested, or to which a blind flange will be secured to.

FIG. 7 hereof is a side view showing a jackscrew embodiment as the actuator for manual operation, by either human or by robotic arms of an ROV, and showing hydrostatic testing equipment attached to the extended front end of a jackscrew and having a hollow passageway (conduit) 5 through its horizontal length and extending through the center of the blind flange 16 for allowing test fluid to be conducted into and out of the flanged item being tested. Also shown is a blown-up view of the section of the blind flange showing one of the O-rings. The blown-up view shows the details of O-ring 34 set in corresponding groove 34a.

FIG. 9A is a view of a preferred adapter plate 200 of the present invention showing tongue 210 and adapter flange or lip 230.

FIG. 9B hereof is a front face view of a preferred the adapter plate 200 hereof, showing the tongue, or projection, 210 which matches groove 220 of rear plate 10 (FIG. 4 hereof), and showing adapter flange 230 for holding the adapter plate against rear plate 10.

FIGS. 3 and 4 herein also show actuator 54 as part of hydrotreating apparatus 3. Also shown in this FIG. 20 is cable 9 that serves to provide support from the surface to ROV 1, and umbilical 8 that provides various services, such as electrical and hydraulic, from the surface It is customary for ROVs to have an arm/gripper 5 to help the ROV to perform its intended duties. Hydrotreating apparatus 3 is better illustrated in FIGS. 1 to 19 hereof. Further, hydrotesting apparatus 3 is also described and claimed in U.S. Pat. No. 10,428,981 and U.S. Pat. No. 10,697,845, both of which are incorporated herein by reference, and both of which were examined and allowed by this Examiner.

DETAILED DESCRIPTION OF THE PRESENT INVENTION

Figure 1A:
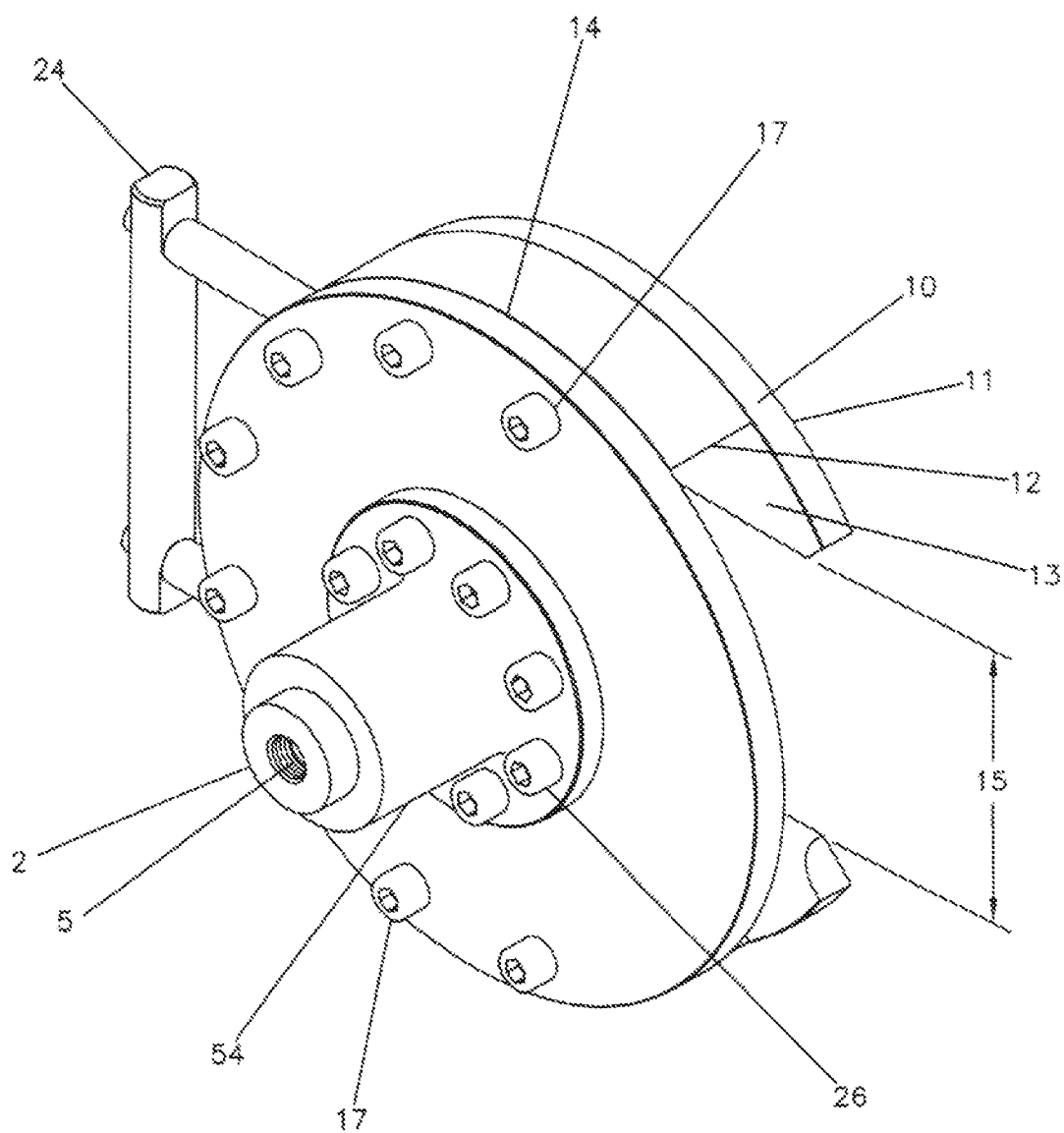
FIG. 1A hereof is an isometric view of the front of a preferred embodiment of the testing apparatus of the present invention showing a generic actuator means (54) and actuator shaft 2 for advancing and retracting a blind flange (shown) in and out of sealing contact against the face of the flange of a flanged item to be tested.

A substantial number of flanged conduits and equipment carry potentially hazardous fluids, often at elevated temperatures and pressures. Because safety is of upmost importance, such flanged conduits and equipment must be tested before, as well as during, industrial use to ensure it meets design constraints and is satisfactory for service. The primary testing method used for such flanged items is pressure testing, also referred to as hydrostatic testing, or hydrotesting. Both terms can be used interchangeably herein. It will be understood that the terms "flanged item", "flanged opening", and flanged equipment can also be used interchangeably herein. Non-limiting examples of such flanged items that are typically required to be pressure tested include piping, pipelines, hoses, pumps, compressors, mixers, boilers, tanks, pressure vessels, heat exchangers, and the like. Such flanged items typically come under numerous regulatory and governmental safety compliance requirements as well as design and fabrication Code criteria. As such, hydrotesting of flanged piping systems, pipelines. as well as related flanged components and equipment are required to be hydrostatically tested under statutory mandates and codes such as the ASME Boiler & Pressure Vessel Code, related Piping Codes, including local and state ordinances, as well as industrial standards. Hydrostatic testing is found in industries and uses such as, but not limited to, high-pressure superheated power steam generation, utility steam generation, offshore oil and gas, petroleum exploration, chemical process, petro-chemical process, petroleum refinery, pharmaceutical, pipelines, building construction, military, petroleum liquid and gas storage tank farm facilities, ship loading and unloading docks, railcar loading and unloading facilities, such as ship-based, barges and other marine transportation systems, internal combustion engines, etc.

Conventional hydrostatic testing typically comprises closing both ends of a flanged item to be tested with a device designed and intended to resist the applied hydrostatic test pressure at the specified pressure and test temperature, and which is compatible with the test fluid. Blind flanges are conventionally used to close both ends. For example, one end is closed using a blind flange having a means for allowing the release of a fluid, such as air, which is displaced when the test fluid, such as water, is introduced. The other end, which will also be closed using a second blind flange, but having attached thereto equipment to introduce the test fluid into the flanged item to be tested and equipment to measure pressure fluctuations, if any, during testing.

Blind flanges are well known in the art and are typically comprised of a solid disk that can be pressed against a flanged opening to block and seal the opening. A suitable gasket material is typically positioned between the blind flange and the flange of the flanged item to be tested to form an adequate pressure seal. It will be noted that the apparatus of the present invention can be used at both ends of the flanged item to be tested. For example, lengths of piping having a flange at both ends can have an apparatus of the present secured to each flanged end. It is preferred that one end of the flanged piping have secured thereto pressure measuring equipment, such as a pressure gauge and suitable valving to allow for the introduction and release of air and testing fluids. The opposite end will preferably have secured thereto another apparatus of the present invention. This apparatus at said opposite end will also contain an actuator and actuator shaft as previously described herein, but will preferably also contain a valve to release air from the flanged item to be tested when a testing fluid in introduced. Of course, the testing fluid used to pressurize the flanged item to be tested can be released from either or both ends.

At least one gasket is affixed, or inserted, between the blind flange and the flange of the item to be tested. Gaskets suitable for such use can be made from any suitable sealing material. Non-limiting examples of such suitable sealing materials include metallic materials, elastomeric materials, non-asbestos fiber-based materials, and graphite materials. Further, the gaskets can be of a variety of configurations depending on the flanged item to be tested. Non-limiting examples of such configurations include full faced, inner bolt circle, segmented, and spiral wound, all of which are well known in the art. Preferred spiral wound gaskets are typically made by winding a metal strip, usually a stainless steel, and a softer filler material such as graphite or PTFE. It is preferred to use multiple O-rings, preferably comprised of an elastomeric material. The O-ring, of any other gasket in the form of a ring, will have a diameter greater than the diameter of the opening of the flanged item to be tested. It is also preferred that the O-rings be embedded within matching grooves annularly positioned on the sealing face of the blind flange.

The apparatus of the present invention is secured to the testing end of the item to be tested and will include a means by which a test fluid, preferably water, can be introduced into the flanged item. The introduction of water will displace air within the item which can be released into the atmosphere at either end of the item to be tested. For example, it is preferred that the non-test end of the flanged item also have an apparatus of the present invention secured thereto so that displaced air can be released through an outlet means, such as a valve, attached to the apparatus. At that point, water will be turned off and air will be introduced to bring the pressure up to the desired test pressure and hold it there for the duration of the test. The desired test pressure according to code, or a prescribed test pressure, which will typically be about 130 to 150% of the designed working pressure.

Pressurization can be applied by any suitable means, but it is generally accomplished by use of a piston pump designed specifically for hydrostatic testing. The piston pump can be powered by any suitable means, such manually or by pneumatic, electrical, or hydraulic means. It will be noted that hydrotesting can also be accomplished using a broad array of industrial gases, preferably an inert gas, more preferably nitrogen. Water is the most preferred testing fluid. The flanged item being tested must not exhibit any observed leakage or pressure declination, except for incidental changes due to atmospheric temperature change or solar radiation exposure. After completion of the prescribed applied pressure and holding time, pressure is released and the equipment drained. Preparation for conventional hydrostatic testing is extremely laborious and costly, both in human resources and time needed to accomplish just the pre-testing procedure. For example, depending on the nominal size of a pipe, the system rated design pressure, and the test temperature, flanged connections can vary significantly in size, weight, and the number of stud bolts or traditional bolts, or bolt and nuts, required to complete the connection. The number of bolts and nuts can vary between about 4 bolts and 8 nuts to about 60 bolts and 120 nuts, or more. Blind flanges can weigh between about 2 pounds to over 16,000 pounds depending on the nominal size and pressure rating. As such, for the blind flange to both energize the gasket and adequately resist hydrostatic end force, the flange bolting must be tightened in a methodical multi-step method. For example, ASME Code (ASME PCC-1—2013) requires that the bolting be torqued (tightened) using a six step, complex cross-pattern tightening sequence methodology as follows:

| Torque increments for cross-pattern tightening | |
|---|---|
| Install | Hand-tighten then "snug-up" to 20 lb-ft (not to exceed 20% of target torque value). Check flange gap around circumference for uniformity. If the gap around the circumference is not reasonably uniform, make the appropriate adjustments by selective tightening before proceeding. |
| Round 1 | Tighten to 20% to 30% of the target torque value. Check flange gap around circumference for uniformity. If the gap around the circumference is not reasonably uniform, make the appropriate adjustments by selective tightening/loosening before proceeding. |
| Round 2 | Tighten to 50% to 70% of the target torque value. Check flange gap around circumference for uniformity. If the gap around the circumference is not reasonably uniform, make the appropriate adjustments by selective tightening/loosening before proceeding. |
| Round 3 | Tighten to 100% of the target torque value. Check flange gap around circumference for uniformity. If the gap around the circumference is not reasonably uniform, make the appropriate adjustments by selective tightening/loosening before proceeding. |
| Round 4 | Continue tightening the bolts, but on a circular, clockwise pattern until no further nut rotation occurs at the round 3 torque target value. |
| Round 5 | Time permitting, wait a minimum of four (4) hours and repeat Round 4; this will restore the short-term creep relaxation/nut embedment losses. |

Given the complexity of bolt installation and tightening requirements, as well as rigging, handling, and lifting very heavy components, the conventional procedure is expensive, extremely laborious, time-consuming, and dangerous. As previously mentioned, conventional hydrostatic testing procedures can take from a couple of hours to one or more days before the hydrostatic test can be initiated by filling the item to be tested with the test fluid and the results observed and measured.

The testing apparatus of the present invention eliminates the need for installing and torquing a plurality of bolts. Additionally, bolting stretches when tightened to energize a gasket to resist hydrostatic test pressure. Therefore, bolting used for conventional hydrostatic testing has a relatively short life-cycle. Furthermore, bolting used for hydrostatic testing must also meet various Code metallurgical and procurement standards, making it relatively expensive to stock and maintain. There are myriad sizes and lengths required to be inventoried for carrying out testing. Further, the significant reduction in time needed to perform hydrostatic testing with use of the instant apparatus proportionally reduces safety risk exposure, costs, and enables considerable enhancement of productivity. This allows substantially more pipes, hoses, and/or equipment to be tested in any given amount of time. The apparatus of the present invention is a quick-acting device that can be installed in minutes as opposed to hours or days, and can be energized in seconds against the flange of the flanged item to be tested.

The instant testing apparatus can be fabricated from any suitable material that can withstand the hydrostatic testing pressures and temperatures, with an appropriate margin of safety. Non-limiting examples of such suitable materials include conventional carbon steel, alloy steel, corrosion resistant steel alloys, aluminum alloys, copper-nickel alloys, and titanium. Also suitable are engineered light-weight aerospace aluminum alloys and forgings, in addition to machined plate, and/or round or flat bar stock typically possessing mechanical properties that significantly exceed that of most common carbon steel alloys.

Preferred materials are the 7xxx series aluminum alloys containing the addition of zinc in the range of about 0.8 to about 12 wt %. In particular, 7075 and 7178 containing chromium, copper iron, magnesium, and manganese additions, including zirconium and titanium for forged components and has a tensile strength of up to and including 88 ksi with a corresponding yield strength of 78 ksi. Other preferred aluminum alloys include, but are not limited to the 6xxx series aluminum alloys having a tensile strength up to and including 58 ksi and a corresponding yield strength of 52 ksi, containing magnesium and silicon additions of about 1.0 weight % and are more easily extrudable than other aluminum alloys. Other preferred aluminum materials are the 5xxx series alloys having a tensile strength up to and including 54 ksi and a corresponding yield strength of 41 ksi, containing the addition of magnesium in the range of about 0.8 to 5.1 weight %. The 2xxx series aluminum alloys include from at least about 0.5 wt. % Copper (Cu) to about 8 wt. % Cu and having an ultimate tensile strength of up to 72 ksi with a corresponding yield strength of 67 ksi. All the above weight percents are based on the total weight of the alloy.

Another class of suitable materials are the chromium-molybdenum heat-treated alloys steels such as 4130, 4140, 4142, 4340, etc. with tensile strengths averaging 100-150 ksi and corresponding yield strengths averaging of 90 ksi. Also suitable are metallic materials that include copper-nickel alloys, and in particular 70-30. Other preferred materials include high-performance nickel alloys such as alloy 600, 625, and 800 with tensile strengths of 85-145 ksi and corresponding yield strengths of 80-110 ksi.

It is also within the scope of this invention that lightweight, high-strength, fiber-reinforced composite materials that are typically comprised of a polymer or ceramic matrix that can be a polymeric material, or a ceramic can be used. The fibers of such materials are generally carbon, metallic, ceramic, carbon nanofibers, or a combination thereof, that can be oriented in a desired orientation in the matrix to add strength and to prevent de-lamination. Essentially, the present invention can be fabricated from any suitable metallic or non-metallic material capable of meeting the required strength needed to resist the hydrostatic test pressure with a suitable safety margin. It is preferred that the apparatus of the present invention be light enough to be manually lifted (far less weight than a conventional carbon or stainless-steel blind flange) for the more commonly tested nominal pipe sizes. Obviously, larger diameter and higher pressure rated flange system can require more than one person to deploy, or can require the use of a hoisting device and lifting eyes. Irrespectively, use of the apparatus of the present invention significantly reduces test time, resources, and cost, while enhancing safety exposure to personnel when compared to conventional methods.

The present invention is designed and intended to be deployed over an extremely broad range of flange designs, configurations, and materials, including but not limited to flat face, raised face, and/or ring joint, screwed, slip-on, socket weld-neck, and long weld neck. The present invention can also be used with intermediate barrel, heavy barrel, equal barrel, lap joint, and orifice flanges for every pressure Class and face configuration as dimensionally specified in ASME B16.1, B16.5, B16.24, B16.36, B16.42, or B16.47, and other industry standards such as API (American Petroleum Institute) Specification 6A flanges of all sizes, configurations, and pressure classes, Manufacturers Standardization Society (MSS) MSS SP-44 flanges of all configurations and pressure classes, and ASTM specifications. The present invention is intended to also be deployed on a broad array of military, proprietary, and hydraulic power flanges. Essentially, the present invention can be used on any flanged fluidic or pneumatic connection germane to any industry, and which can be fabricated from any suitable metallic or non-metallic material.

Not only is the present invention capable of being deployed over a broad range of flange designs but also, the same basic piece of clamping apparatus of the present invention can be used for a variety of pipe and flange sizes. This is done by use of the adapter plates of the present invention. That is, depending on the diameter of the flange, a suitable adapter plate having a corresponding slot size opening, can be inserted between the blind flange and the rear plate section of the apparatus. An adapter plate of the present invention will typically be used when the diameter of the flange of a flanged item to be tested is too small for the slot of the rear section of the apparatus. That is, when the flange of the item to be tested would push through and not be secured in the testing apparatus. For such cases an adapter plate having a slot size that is small enough to be used with the smaller diameter flanged item, but large enough itself that it will not push through the slot of the rear plate section of the testing apparatus will be used.

It is also within the scope of the present invention that a single adapter plate can be used for more than one flange and pipe size as long as the sizes are within a relatively narrow size range for which a individual adapter plate was designed. The important thing is that the flange of the flanged item to be tested is large enough to be held in place by the adapter plate. In fact, for use with the simplest adapter plate illustrated in FIGS. 10A, 10B, and 10A hereof multiple adapter plates can be inventoried each for a particular sized flange. For more complex adapter plates, such as that illustrated in FIGS. 9A and 9B hereof, a single adapter plate can be designed for more than one pipe size. For example, one size adapter plate can be used for pipes having a nominal size of 2, 3 and 4 inches and a next larger size adapter plate can be used with pipes having a nominal size of 6, 8, and 10 inches. Such nominal pipe sizes refer to multiple size adjustment plates can be kept on hand to cover a broad range of diameters. For example, one or more smaller adapter plates can be used for a range of smaller diameter flanged items, one or more medium sized plates can be used for flanged items in a so-called medium diameter range and one or more large sized plates can be used for a variety of large diameter flanged items. Pipes sizes when referred to herein are those well-known in variety of process engineering arts. This is accomplished by use of a specific size adapter plate of the present invention illustrated particularly in FIGS. 2A and 2B hereof. Such pipe sizes are based on the U.S. standard for pipes, abbreviated NPS or Nominal Pipe Size. "Nominal" refers to the pipe in non-specific terms and identifies the diameter of the hole with a non-dimensional number, for example "2 inch nominal steel pipe, which consists of a variety of steel pipe with the only criterion being a 2.375 inch (60.3) outside diameter. Tables of standard nominal pipe sizes can be easily obtained via the internet as well as in many engineering handbooks. Therefore, no further discussion is needed herein.

Figure 1B:
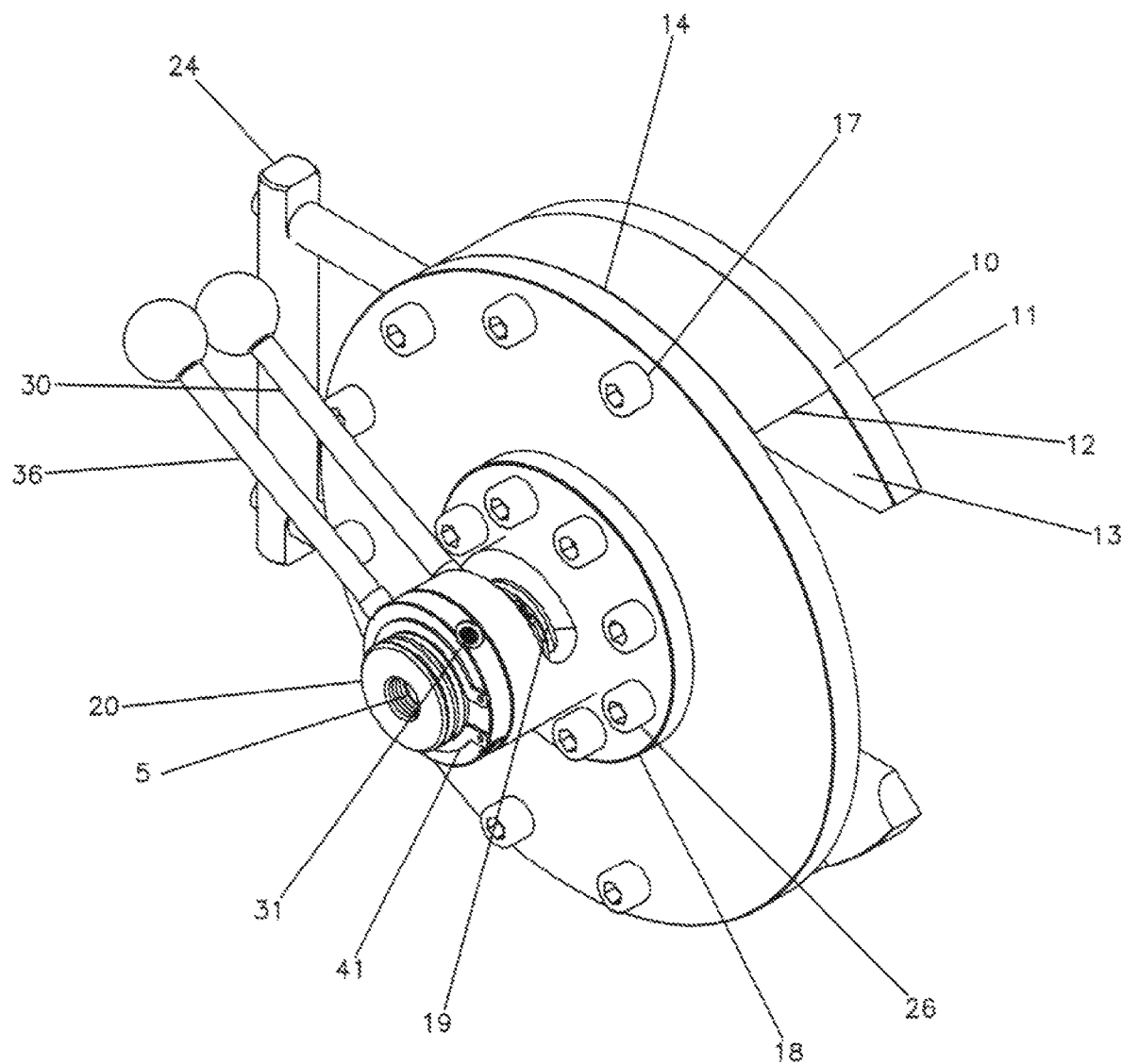
FIG. 1B hereof is an elevated perspective front view similar to the view illustrated in FIG. 1A hereof but showing a jackscrew assembly (30, 36, 20, 18) as a manual actuator means for advancing and retracting blind flange 16 into and out of a sealing contact against the flange of a flanged item to be tested.

The present invention will be better understood with reference to the figures hereof. FIG. 1A hereof is an isometric front view of a preferred embodiment of testing apparatus of the present invention which is comprised of a slotted rear plate section 10 having a rearward facing flat surface 11 and front facing flat surface 13. The size of slot 15 (which slot can also be referred to as a cut-out) of rear plate section 10 is sufficient to accept the flanged item to be tested, preferably a flanged pipe, but smaller than the diameter of the flange such that the flange of the flanged item so that the flanged item will not slip through the slot during testing. That is, the flange of the flanged item being tested is held securely against the front surface of the front face 13 of rear section 10 during testing. When an adapter plate of the present invention is used, the adapter plate will also be of sufficient size to prevent the flange from slipping through the slot of the adapter plate. It is preferred that the flanged item to be tested be a flanged pipe or pipe section, such as that illustrated in more detail in FIG. 6 hereof. The size of slot 15 is not specific to the outside diameter of the pipe to which a flange is attached, but is more specific to the diameter of the area where the flange is secured, preferably by welding, to the pipe, or item to be tested. This will allow the apparatus of the present invention to be positioned (slipped) over and securely clamped to the flange of the flanged item to be tested. Handle 24 is shown in FIGS. 1A and 1B, but may be optional in some instance, such as when the size and weight of the apparatus is too large and too heavy to be moved by hand. In such a case a lifting device such as a padeye (not shown) can be attached to the apparatus and a crane or other lifting machine used to position the apparatus in place.

Figure 5:
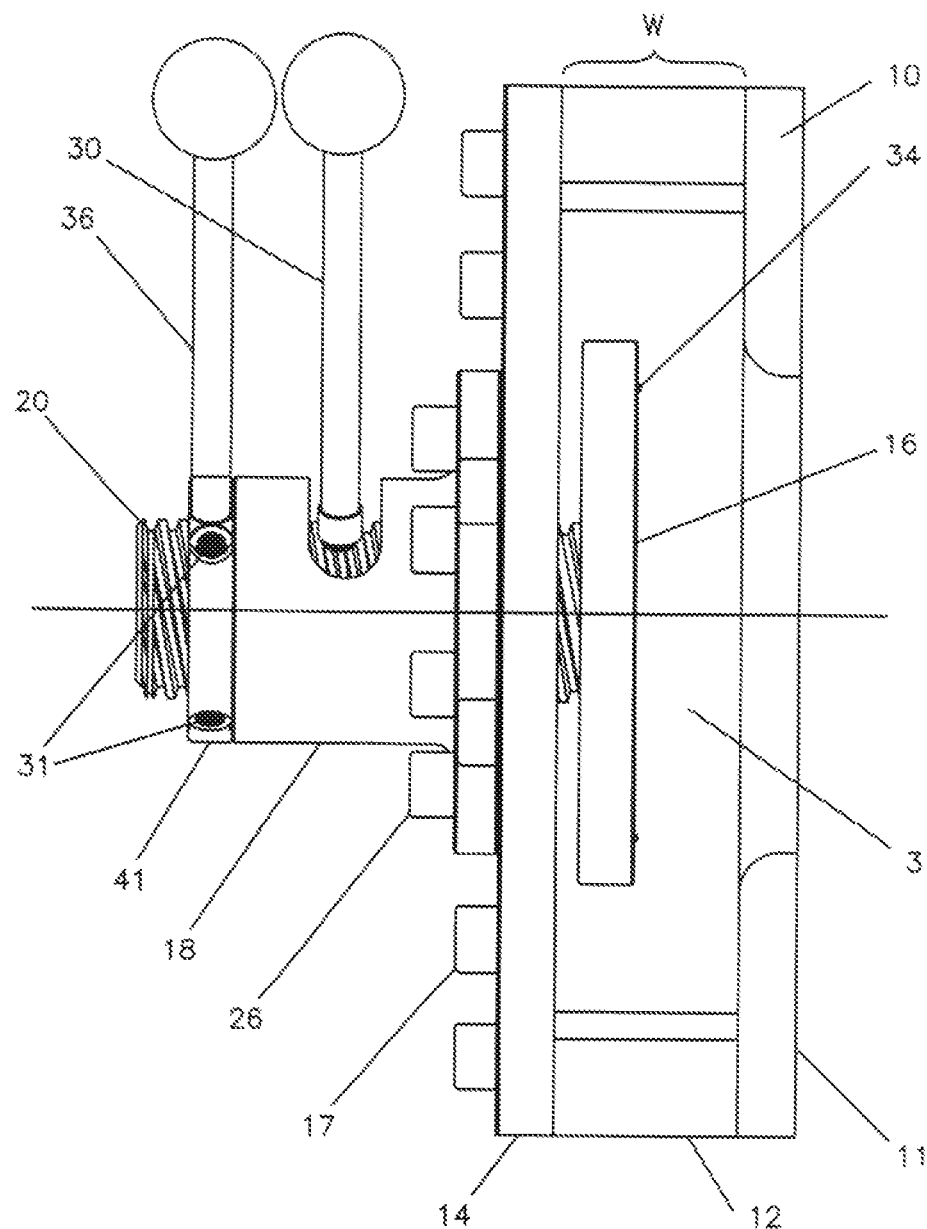
FIG. 5 hereof is side view of a preferred testing apparatus of the present invention, but showing a jackscrew assembly 20 (actuator shaft shown as a Jackscrew) 18 (actuator), 30 (lever), 36 (lever) as a manual actuator means for advancing and retracting blind flange 16 into and out of contact against the flange of an item to be tested (not shown), which manual means can be operated by use of robotic arms of a remotely operated vehicle. The width of said middle section is shown by the letter W representing space 3 between the circular front plate section and the circular rear plate section.
Figure 16:
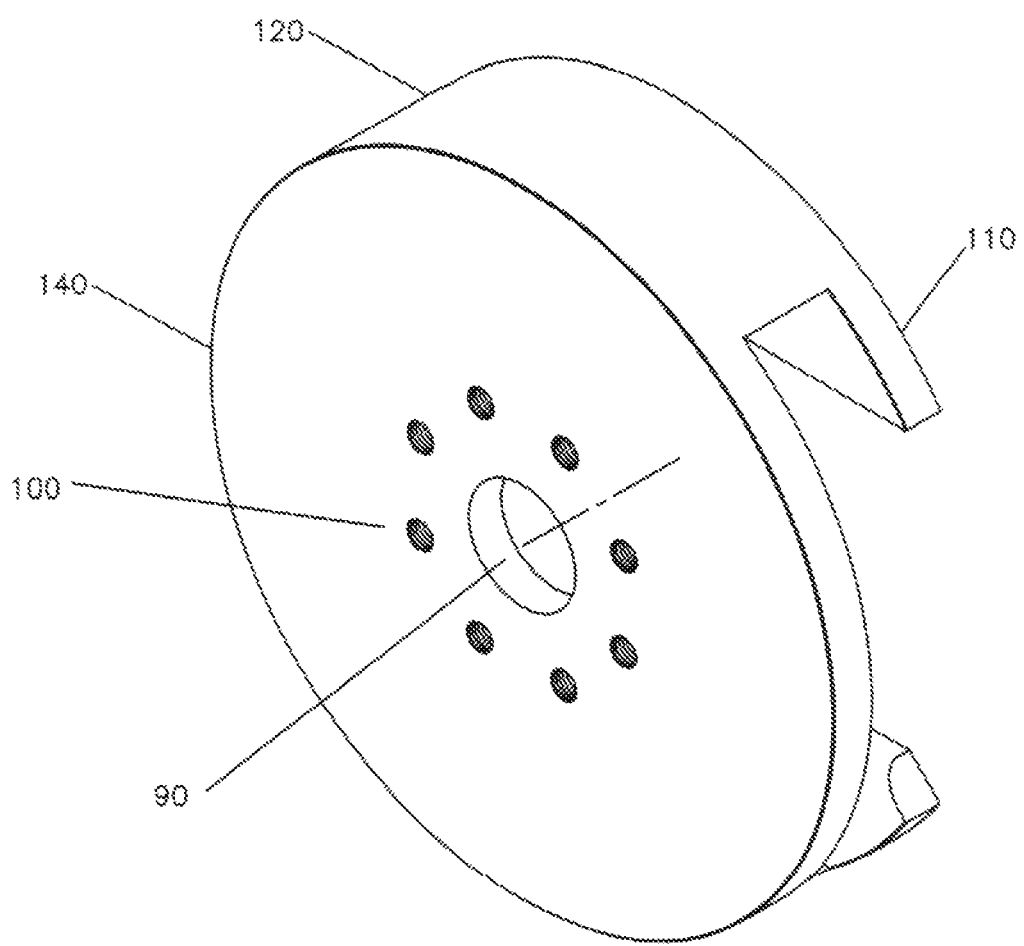
FIG. 16 hereof is an elevated perspective view of the front face of a preferred embodiment 120 of this invention, wherein the front section, the spacer section, and the rear sections are not individual component parts secured together, but are sections, or areas, of a single unitary piece that is manufactured by a method such as forging, casting, extruding or machining. Sections 110, 120, 140, correspond to individual plate sections 10, 12, and 14 in FIGS. 1 and 2 hereof.

There is also provided a front plate section 14, which is preferably circular, having at its center an annular opening 90 shown in FIG. 16 hereof, which opening can also be referred to as a through-hole. The diameter of the through-hole will be of sufficient diameter to allow unrestricted passage of axial actuator shaft that in one preferred embodiment can be piston rod 2, which can also be referred to as the actuator shaft, the actuator being item 54, which for purposes of this figure is a jackscrew which is also illustrated as item 20 (FIG. 5 hereof). The actuator is secured to circular front plate 14 by bolts 26. A blind flange 16 is secured to the rearward end of the actuator shaft, which shaft is capable of being moved by the actuator longitudinally (back and forth) between slotted plate section 10 and front plate section 14. The actuator shaft will include a conduit, or passageway 5, open from one end of the shaft to the other end of the shaft and through the center of blind flange 16 to allow for a test fluid to be conducted there-thru into the flanged item to be tested.

A slotted spacer, or middle section 12, is located between slotted rear plate section 10 and circular front plate section 14. Slotted middle section 12 is of sufficient width W that defines space 3 (FIG. 5 hereof) between front and rear plate sections. Width W is of a sufficient dimension so that blind flange 16 and flange 38 (FIG. 6 hereof) of a flanged item to be tested can fit within space 3 with enough room so that blind flange 16 can be engaged and disengaged against the flange 38 of the flanged item to be tested. It will be understood that one or more of slotted rear plate-like section 10, slotted middle section 12, and circular front plate section 14 can be separate individual parts secured to one or more neighboring sections by any suitable securing means, preferably by use of bolts, such as those shown in the Figure as 17. It will be noted that a handle 24, that is provided in FIGS. 1A and 1B is optional is some instances. It is within the scope of this invention that any two or all three sections can be fabricated as a single piece. FIGS. 1 to 9 hereof show the embodiment of the present invention wherein all three sections are individual sections secured together by a suitable means. FIGS. 16-19 hereof show another preferred embodiment of the present invention wherein all three sections are fabricated as a single unit manufactured by any suitable process. Nonlimiting example of processes to manufacture the single unit include forging, casting, extruding, and machining.

Figure 7:
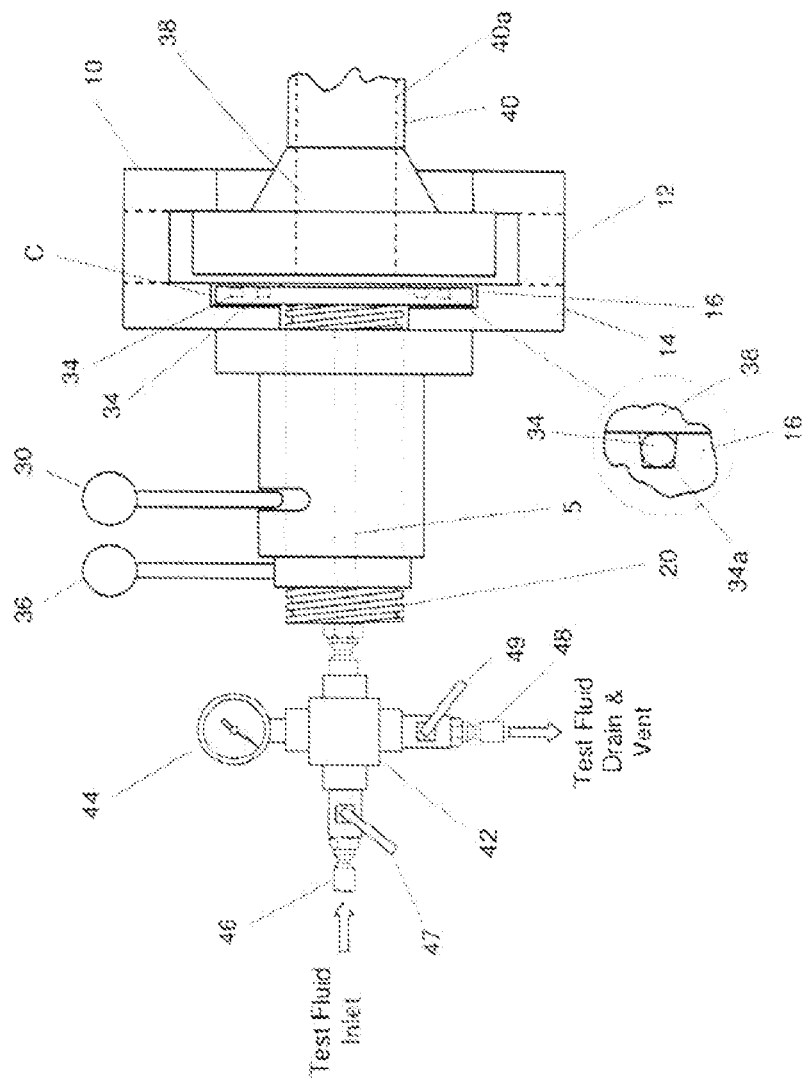
Figure 8:
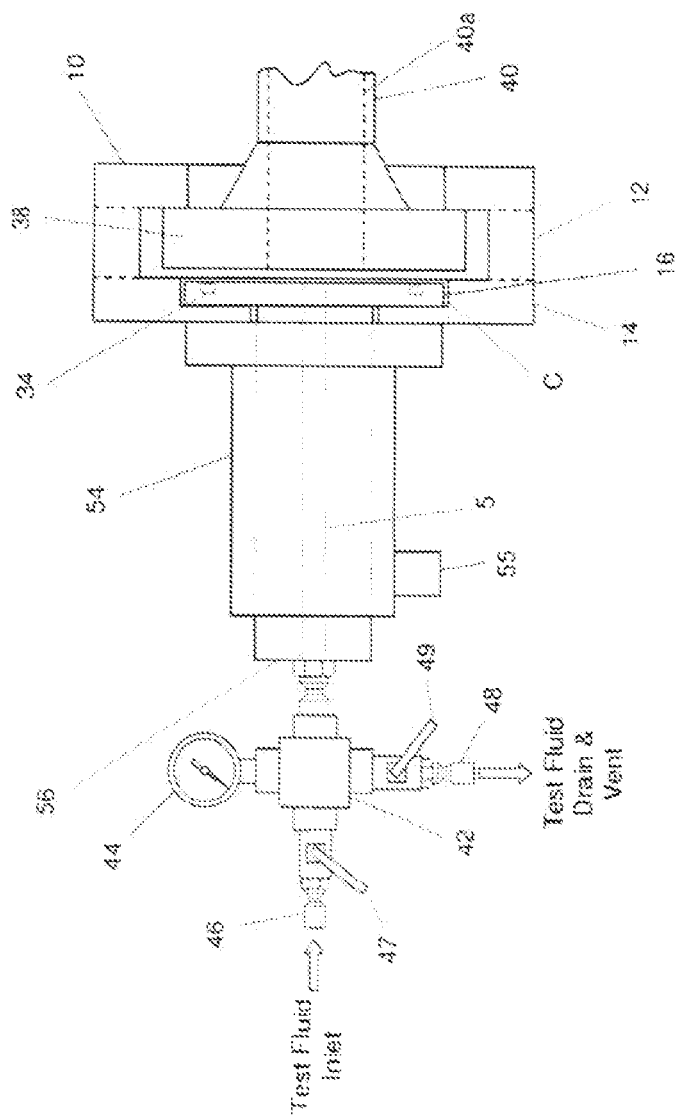
FIG. 8 hereof is a similar view to FIG. 7 hereof but showing an actuator that is activated by a means other than manual, which means can include hydraulic, electric, pneumatic, etc.

As previously mentioned, FIG. 1 hereof also shows an axial non-obstructed passageway 5 through actuator shaft 2, or jackscrew 20, as applicable and through the center of blind flange 16. Passageway 5 is used to conduct testing media, which in most cases will be water and air, into and out of the flanged item to be tested. It is preferred that the interior of the front or outer end of this passageway be threaded to allow for the attachment of hydrostatic testing equipment, such as valves, manifolds, quick connect fittings, pressure gauges, etc. Non-limiting examples of preferred testing equipment include a pressure gauge, a fill valve, and a vent valve, as shown in FIGS. 8 and 9 hereof. FIGS. 7 and 8 also show a pipe nipple 46, or quick-connect coupling device, both of which are well known and accepted in the art.

FIG. 1B hereof is similar to that of FIG. 1A hereof but showing a jackscrew as the actuator. Jackscrews are well known in the art and are generally defined as screws that can be turned to adjust the position of an object into which it fits. Such a means will be able to move blind flange 16 against the face of the flange of the flanged item being tested and to release it from the face of said flange to allow the apparatus of the present invention to be removed and used on another flanged item to be tested. It is an embodiment of this invention that a jackscrew of the present invention be operated by a robotic arm of an ROV either under a body of water or on land.

Figure 2:
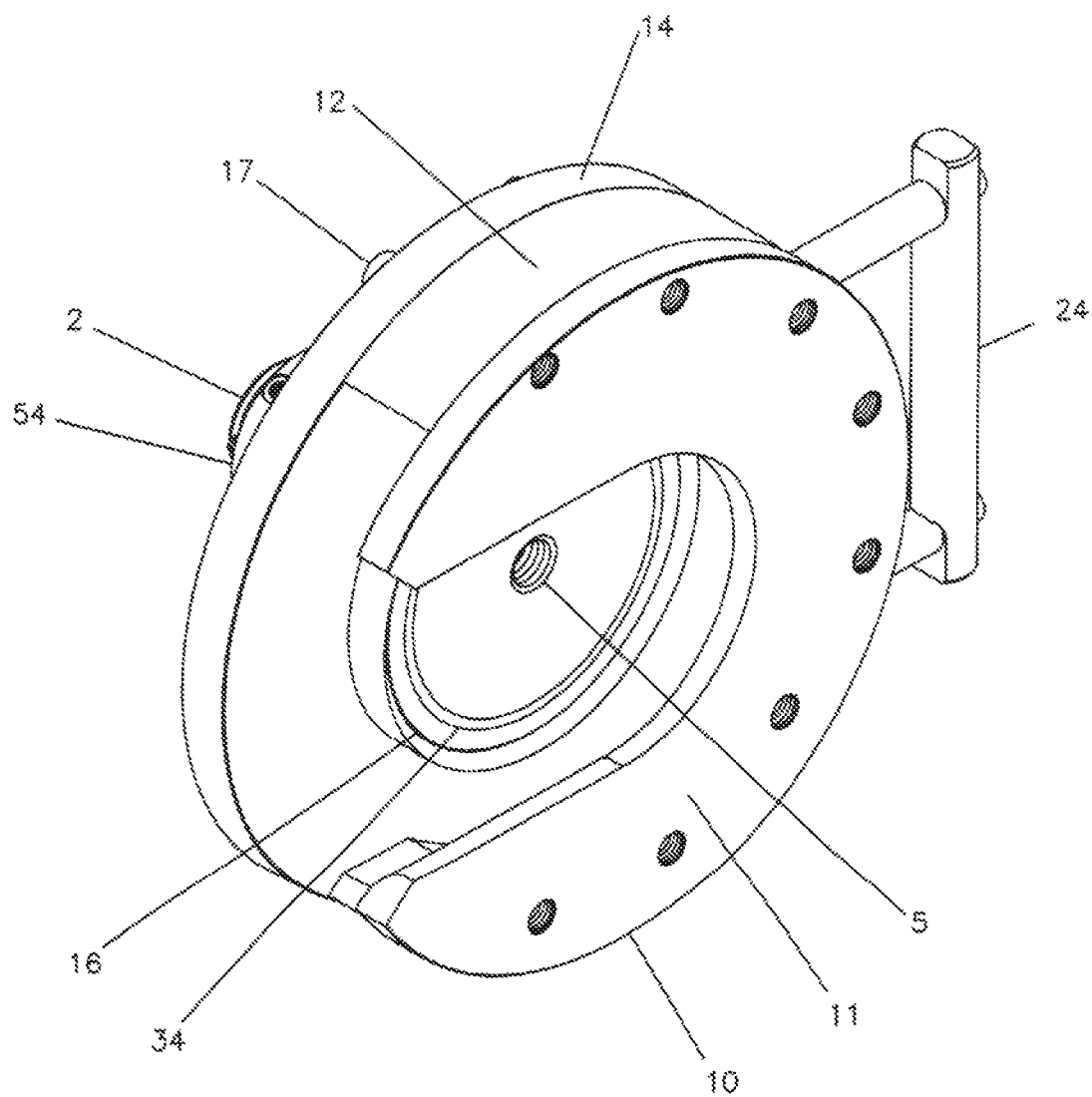

FIG. 2 hereof is an isometric view of back of the preferred embodiment of FIG. 1 hereof, but showing one preferred sealing means as O-ring 34 comprised of a suitable sealing material, preferably an elastomeric material embedded in a corresponding annular groove around the outer face of blind flange 16. The O-ring is positioned so that a portion of it extends an effective distance above the face of the blind flange to enable it to be compressed against the surface of the flange of the flanged item to be tested to result in a leak-proof seal during testing. It will be understood that more than one O-ring, or other type of gasket, can be used so that there can be multiple sealing surfaces during high pressure testing. For example, a flat gasket of suitable sealing material can be used between blind flange 16 and flange 38 (FIG. 13), of the flanged item to be tested. While an elastomeric material is preferred, the gasket or O-ring, can be fabricated from a material such as vegetable fiber, plastic, etc. as previously discussed herein. Any sealing arrangement of the present invention can also fit into a packet of some other suitable form that is integral with, or machined into, blind flange 16.

Blind flange 16 will preferably contain at least one annular gasket, more preferably at least one O-ring (34 in FIG. 2 hereof). The corresponding annular groove and be provided in the surface of blind flange 16 by any suitable technique such as machining, pressing, casting, forging and the like, to produce the mating surface of the blind flange. The mating surface is the surface that will be pressed against the surface of the flange of the flanged item to be tested in such as manner as to create an adequate seal against test pressures. While a conventional blind flange will typically include mounting holes around its perimeter to enable it to be secured to the flange of the flanged item to be tested, blind flange 16 of the present invention will not have such holes. It will instead be activated against the flange of the flanged item to be tested by activating the actuator shaft 2, or 20 (FIG. 4 hereof) so that an annular gasket, which will preferably be one or more O-rings (34 of FIG. 3 hereof) is energized against the surface of the flange of item to be tested. It will be noted that FIG. 3 hereof also shows circular cavity C which is built, preferably by machining, into the back face circular front plate 14. Cavity C will be of sufficient depth and diameter to accommodate the thickness and diameter of blind flange 16 which can be retracted into it for protection when not in use.

An actuator means 54 is provided for supporting and moving actuating shaft 2 in both longitudinal directions to engage and disengage blind flange 16 against the flange of the flanged item to be tested. Unlimited examples of such actuator means include manual (preferably a jackscrew 20), hydraulic, pneumatic, electrical, and/or a magnetic actuator cylinder 54 or housing (FIG. 8 hereof), or flanged mechanical jackscrew nut 18 (FIGS. 1B and 5 hereof) secured to front circular plate 14 by use of any suitable securing device, preferably bolts 26. It will be understood that jackscrew nut, or hub 18, can be integrally manufactured with circular front plate 14 into a single unit, or it can be attached by any suitable including a press fit or the use of bolts.

Figure 4:
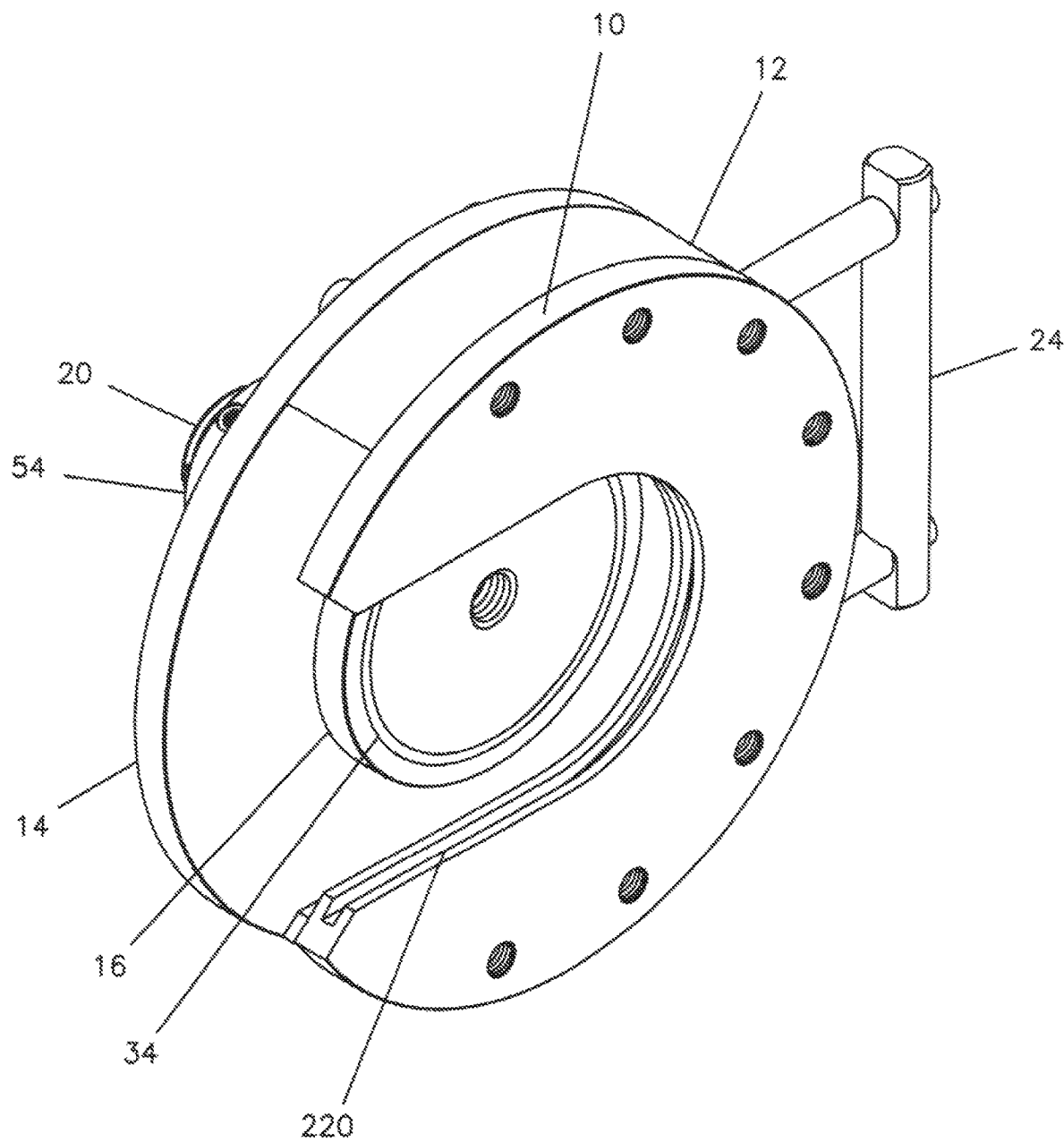
FIG. 4 hereof is an elevated perspective view of the rear of a preferred embodiment illustrated in FIG. 2 hereof showing a blind flange 16 having an O-ring 34 partially embedded in a corresponding groove, which O-ring is capable of establishing a substantially leak-proof pressure-seal when pressed against the flange of a flanged item to be tested. Also shown is groove 220 located along the edge defining the slot of rear plate section 10 for receiving tongue, or projection 210 of adapter plate 200.

FIG. 4 hereof is an illustration of the preferred embodiment of FIG. 2 hereof but showing actuator 54 not as a manually operated actuator, but which can be activated by a power source such as hydraulically, pneumatically, electrically or magnetically. This manual means is shown as a jackscrew 20 and jackscrew nut 18 which is secured to circular front plate 14 by a plurality of bolts 26. As previously mentioned, blind flange 16 (shown in FIG. 5) is actuated and locked into place by use of two levers 30 and 36. Lever 30, is preferably secured directly to jack screw 20, and is used to advance the blind flange 16 so that it sealingly presses against the face of flange 38 shown in FIG. 5 hereof forming a seal. This compresses one or more O-ring seals or other gasket or sealing material and energizing it such as to provide an adequate seal while being constrained in the O-ring groove or seal pocket. All such sealing mechanisms and devices are well known in the art. Lever 36, which is secured to lockring 41, which itself is secured to jack screw 20 by locking screws 31, is used to lock jack screw 20 into place to prevent inadvertent movement of blind flange 16 away from the flange of the flanged item being tested. Such a feature is considered desirable for safety reasons, particularly while testing at high pressures and/or while using a gaseous test media. As such, the locking step is more of an added safety feature to prevent back-slipping, but this embodiment of the apparatus of the present invention can be successfully operated with use of only lever 30. In other words, it is preferred that both levers be used. It will be noted that jack screw nut 18 contains a cutout 19 of suitable dimensions to allow levers 30 and 36 to travel clockwise and counter-clockwise during engagement and disengagement of blind flange 16.

FIG. 5 hereof is a side view of the embodiment of FIG. 4 hereof showing space 3 defined by the width W of slotted spacer section 12. This FIG. 5, as well as FIG. 6 hereof, also shows lock ring 41 with locking screws 31 which are secured to lever 36. Size adapter plate 200 is shown secured in position to rear plate 10 by use of adapter tongue 210 of the size adapter plate 200 and groove 220 of rear plate 10. Lip, or adapter flange, 230 is shown secured against the front facing surface 13 of rear plate section 10. It will be noted that the terms "rear plate" and "rear plate section" are sometimes used interchangeably herein since the front plate section 14 and middle section 12 and rear section 10 can be either separate plates secured together by any suitable means, or can all be sections of a single piece having the three sections comprising a single physical unit.

Figure 6:
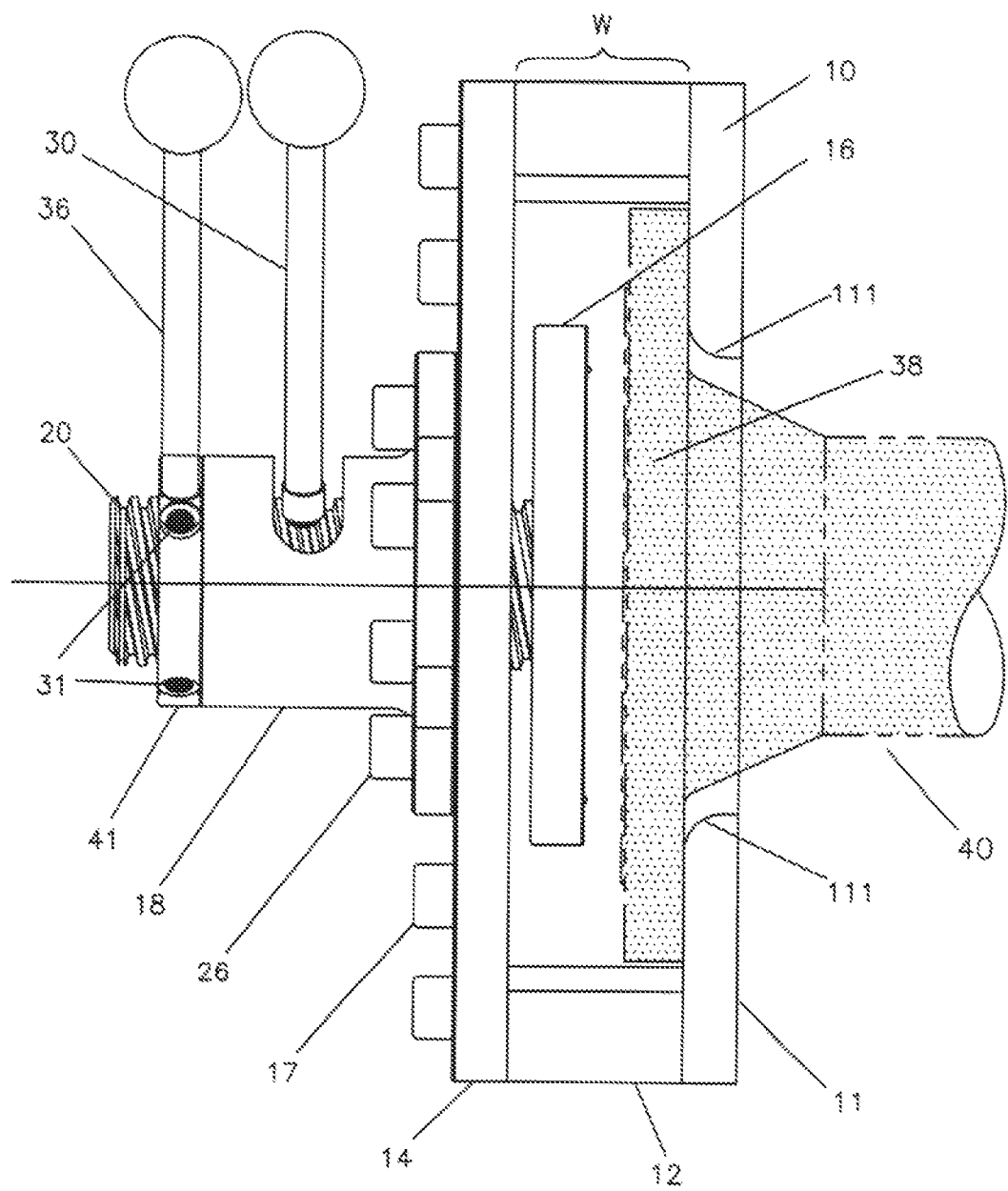
FIG. 6 hereof is a side view similar the one illustrated in FIG. 5 hereof, but showing a flanged pipe section 40 having flange 38 positioned in-place in the testing apparatus of the present invention waiting for activation of blind flange 16 against flange 38.

FIG. 6 hereof is substantially the same side view illustration of FIG. 5 hereof, but showing flange 38 affixed to the pipe, hose, or equipment 40 to be tested. FIG. 6 hereof shows blind flange 16 in sealing contact with flange 38 sufficiently to energize an O-ring or gasket seal (not shown), or any other suitable fluid sealing material against the face of flange 38. It will be noted that it is preferred that that portion of adapter plate 200 that contacts in the vicinity of where pipe 40 is secured to flange 38 contains a curved edge 111 that will effectively correspond to the curved area where the flange and pipe are connected. FIG. 6 hereof also illustrates the adaptability of the present apparatus wherein it is shown that adapter plate 200 is used to accommodate pipes and flanges of smaller diameter than would otherwise be acceptable if no adapter plate were used.

FIG. 7 hereof is a side view of the embodiment illustrated in FIG. 5 hereof, but showing the internal passageway 5 through jack screw 20 and through the center of blind flange 16, which passageway serves to deliver testing fluid into the flanged item to be tested. FIG. 7 also shows a test manifold 42 and conventional equipment used for hydrostatic testing which includes pressure gauge 44, inlet valve 46 and inlet control handle 47, for controlling the flow of fluid into the item to be tested and outlet valve 48 and outlet control handle 49 for removing test fluid from the flanged item that was tested. It will be noted that in all figures, jack screw 20 is just one embodiment of actuator shaft 2, which will preferably extend past the jack-nut or actuator. Also shown in FIG. 7 hereof is a blown-up view of the section of the blind flange showing an O-ring. This blown-up view shows the details of O-ring 34 set in a corresponding groove 34a.

FIG. 8 hereof shows an apparatus of the present invention similar to that shown in FIG. 7 hereof, but where the blind flange actuator 54 is not manually operated, but which can be activated hydraulically, pneumatically, electrically or magnetically. Such types of actuators are well known in the art and are used daily worldwide in myriad applications around the world. Thus, no further discussion of such devices is needed herein for one having at least ordinary skill in the art to reproduce and appreciate the advantages of the apparatus of this invention. FIG. 8 hereof also shows inlet port 55 that allows hydraulic fluid to enter the actuator to move said actuator shaft 56 which is secured at its end to blind flange 16. Pipe 40 is shown with inner pipe diameter 40a and flange 38.

Figure 13:
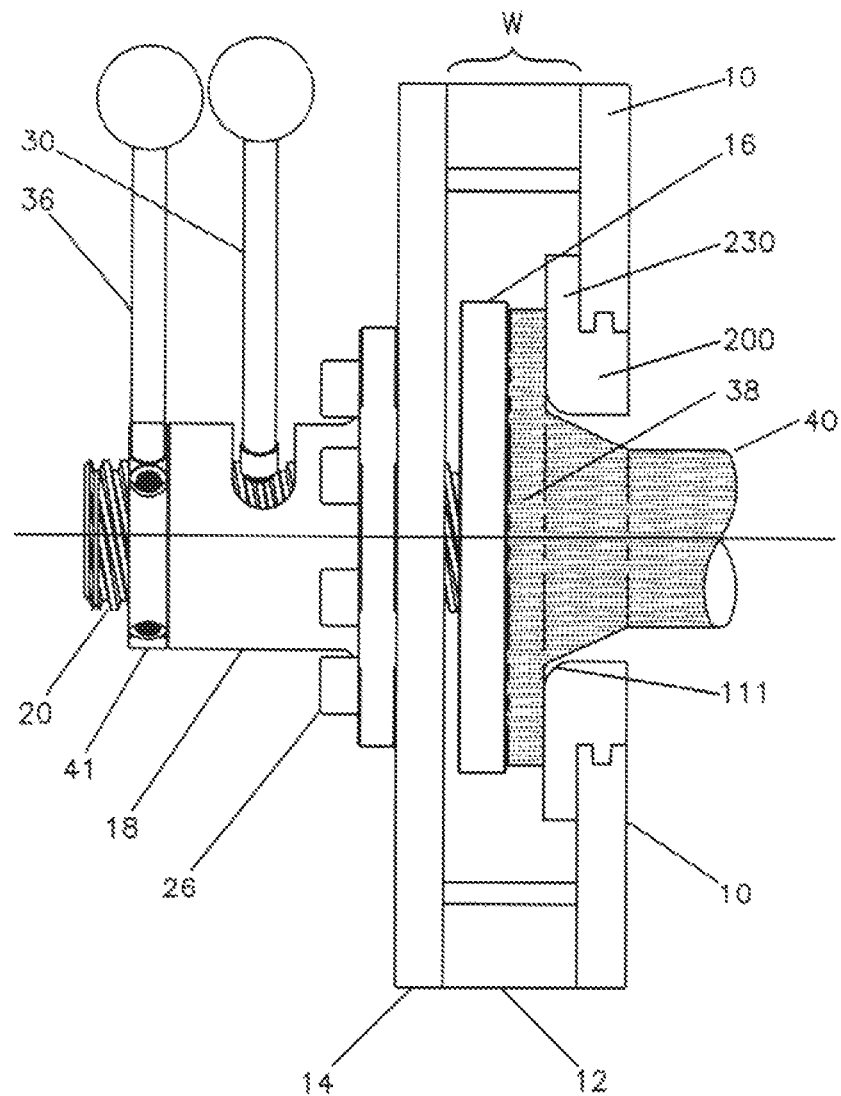
FIG. 13 hereof is a view similar to that shown in FIG. 12 hereof, but showing pipe 40 having flange 38 secured-in place against adapter plate 200 on its back face and blind flange 16 at its front face.
Figure 15:
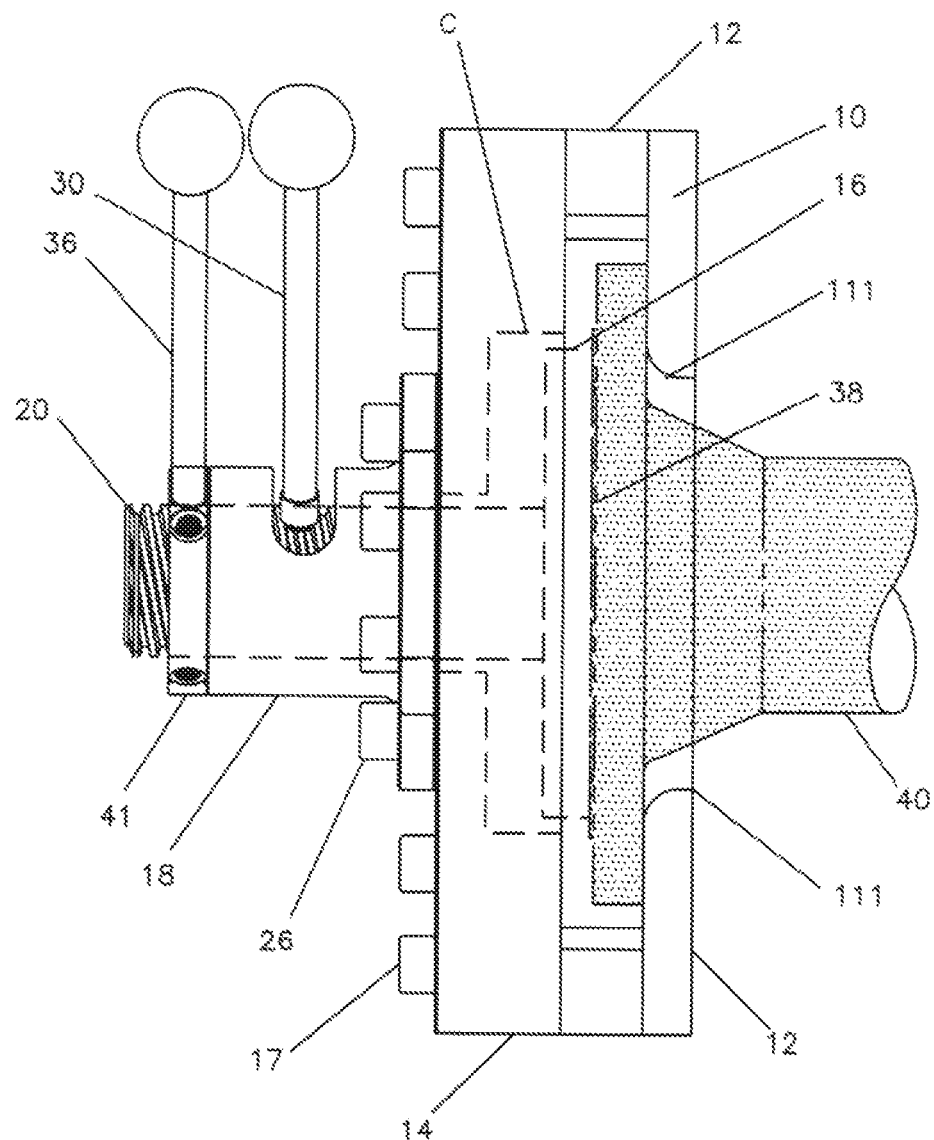
FIG. 15 hereof, is similar to FIG. 14 hereof but showing blind flange 16 extended from Cavity C and secured against flange 38 of the flanged pipe 40 to be tested.

FIGS. 6, 13 and 15 hereof show a flanged pipe section positioned through the slot in circular back plate 10 ready to engage a blind flange. They also show item 111 which represents a preferred feature of the back plate section, which is a curvature along the edge of the slot or cut-out to accommodate the curvature of a flanged item being acted on.

As previously mentioned, slotted rear plate section 10, slotted spacer 12, and front plate section 14, if individual components, can be secured to each other by any suitable means. Non-limiting examples of suitable means for securing any combination of these parts together include bolts 17, or nuts and bolts, welds, adhesives, and or interference press fits. Interference press fits are well known in the art and are typically referred to as a fastening between two parts that is achieved by friction after the parts are pushed together, rather than by any other means of fastening. Preferred is the use of bolts of sufficient length to be screwed through all three sections through matching bolt holes or having matching threaded bolt holes located around the periphery of each part. It is within the scope of this invention that these individual parts can be fabricated as a single unit comprised of all three sections by any suitable means, such as forging, casting, extrusion, or machining, or any other suitable technology. There can also be provided an optional handle 24, that is shown in FIGS. 1A and 1B hereof, of any suitable design, to aid in positioning and removing the apparatus of the present invention to and from the flanged item to be tested. There can also be provided one or more lifting eyebolts (not shown) or lifting padeyes (not shown) attached to any suitable location of the apparatus of the present invention by means of screw threads, welded, press fit, or through the use of adhesives, and/or integrally forged, cast, or extruded to enable the apparatus of the present invention to be positioned with use of powered lifting equipment.

FIG. 9A hereof is a view looking toward the open end of the U-shaped adapter plate 200 of the present invention. Tongue 210, which can also be referred to as projection or tab, is designed to match groove 220 of rear plate section 10 (FIG. 14) so that the adapter plate can be slide into the groove so that the apparatus of the present invention can be used for targeted flanged pipe sizes too small for use with the basic clamping apparatus without the use of an adapter plate. Lip, or flange, 230 is designed to rest against front facing surface 13 of rear plate section 10 to hold the adapter plate in position during testing. The adapter plates, which can also be referred to as size adapter plates or adjustment plates and can be manufactured from any material previously mentioned for the manufacture of the basic parts of the testing apparatus of the present invention. FIG. 9B is a side view adapter plate 200 of the present invention. By adapter plate, we mean that without use of an adapter plate, a given apparatus of the present invention would only be able to be used for the single, or very narrow range of flange sizes, for which the apparatus was designed. Flanged pipe sizes smaller than the size designed for the base clamping apparatus would typically not be able to be safely tested and pipe sizes larger would not be able to be accommodated. Consequently, using a size adapter plate of the present invention designed for smaller diameter pipe sizes vastly improves the range of pipe sizes and usefulness of a given clamping apparatus.

Figures 10A, 10B, 10C:
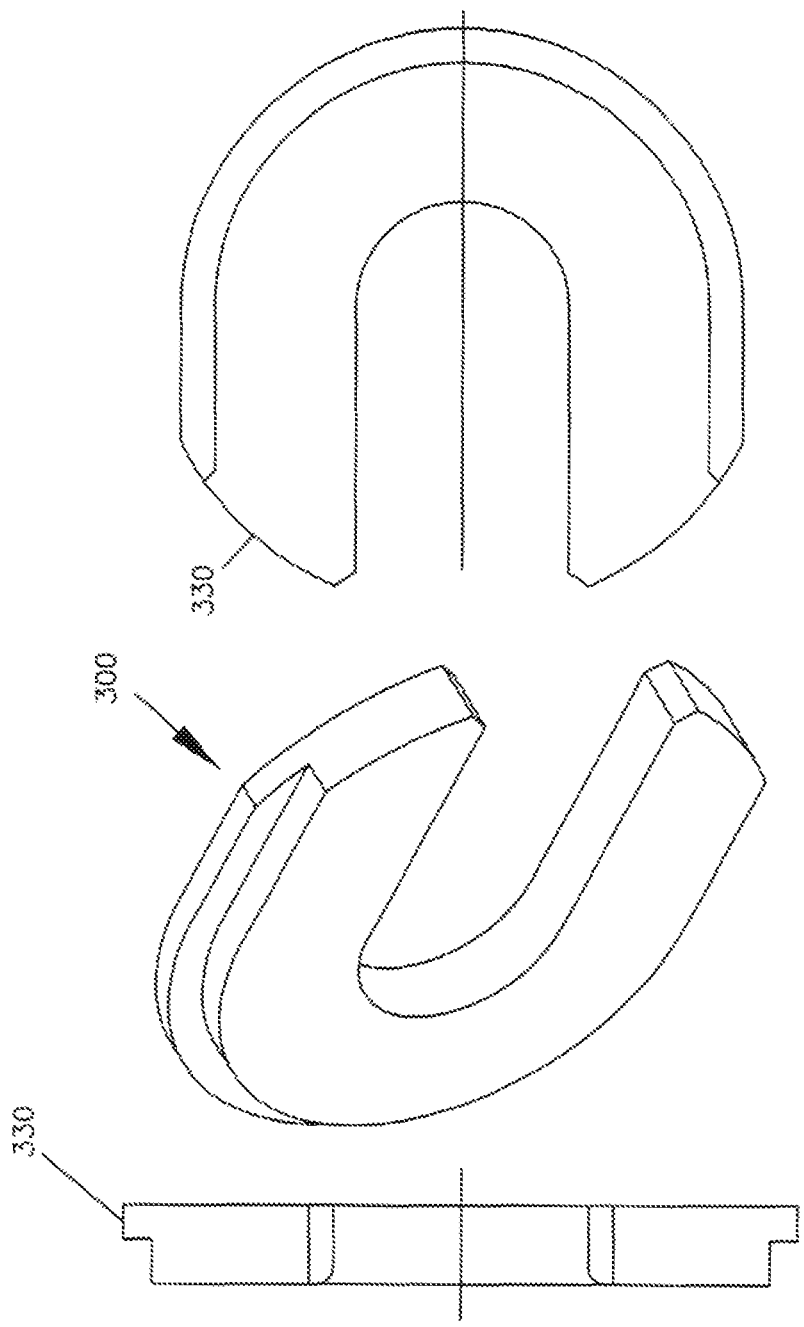
FIGS. 10A, 10B, and 10C hereof are three different views of another type of adapter plate designated 300 of the present invention showing lip 330 which can be slid into place in groove (220) of the apparatus of FIGS. 4 and 18 hereof.

FIG. 10A-10C are three views of another, and more preferred, embodiment of the adapter plate 300 of the present invention showing flange 330 of suitable dimensions to fit groove 220 (FIG. 15 hereof) for securing the adapter plate in place during testing.

Figure 11A:
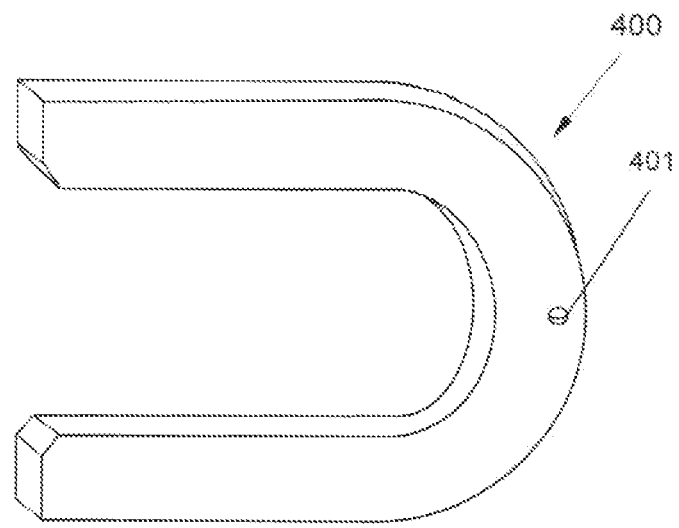
FIG. 11A hereof is an isomeric view of another preferred adapter plate 400 of the present invention showing a single hole 401 for receiving pin 402 so secure it within slot or groove 420.
Figure 11B:
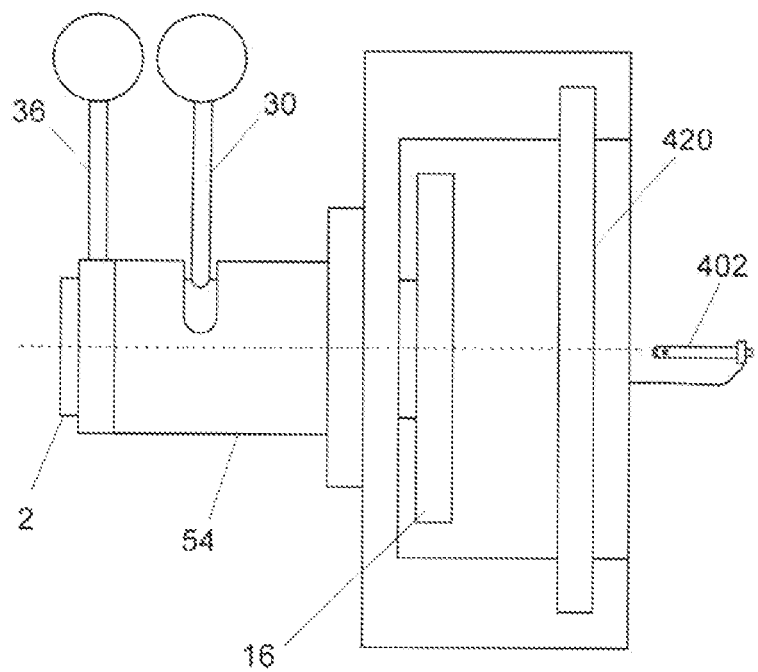
FIG. 11B hereof is a side view of a jackscrew single unitary clamping housing similar to that of FIG. 6 hereof but showing slot, or groove 420 capable of receiving adapter plate 400. This figure does not show the adapter plate positioned in groove 420.

FIG. 11A hereof is an isometric view of another, and more preferred, embodiment of the adapter plate 400 of the present invention showing hole 401 which will match a hole in testing apparatus so that the adapter plate can be secured in place with use of pin 402. It will be understood that although this FIG. 11B shows only one hole any number of holes can be used as long as the physical integrity of the adapter plate is not compromised.

Figure 12:
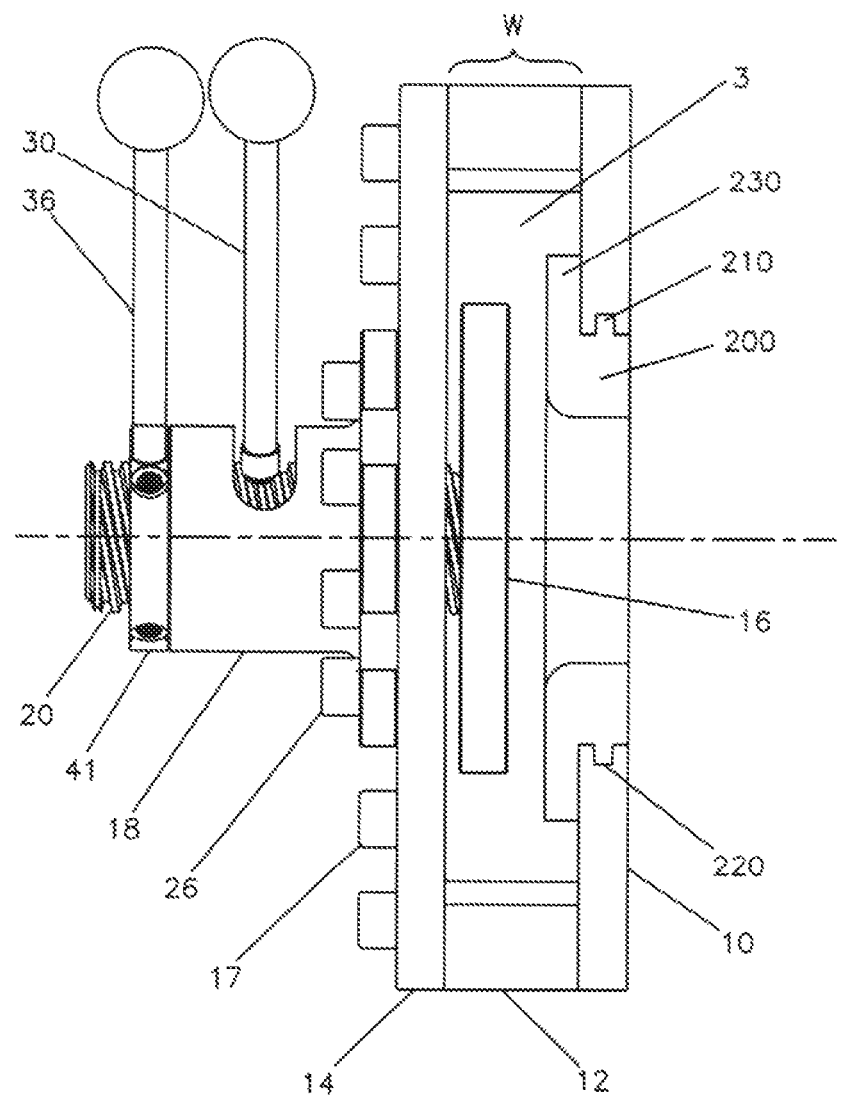
FIG. 12 hereof is a side view of a preferred embodiment illustrated in FIG. 5 hereof showing the blind flange not engaged against a flange of a flanged item to be tested but showing an open-side view of removable adapter plate 200 inserted into groove 220 of rear plate 10 of the apparatus of the present invention.

FIG. 12 hereof is a side view similar to that shown in FIG. 1B hereof, but showing use of adapter plate 200 of the present invention.

FIG. 13 hereof is a side view similar to that of FIG. 12 hereof, but showing pipe 40 with flange 38 in position to be acted upon by blind flange 16. Also shown in this FIG. 13 is an adapter plate 200 of this invention.

Figure 14:
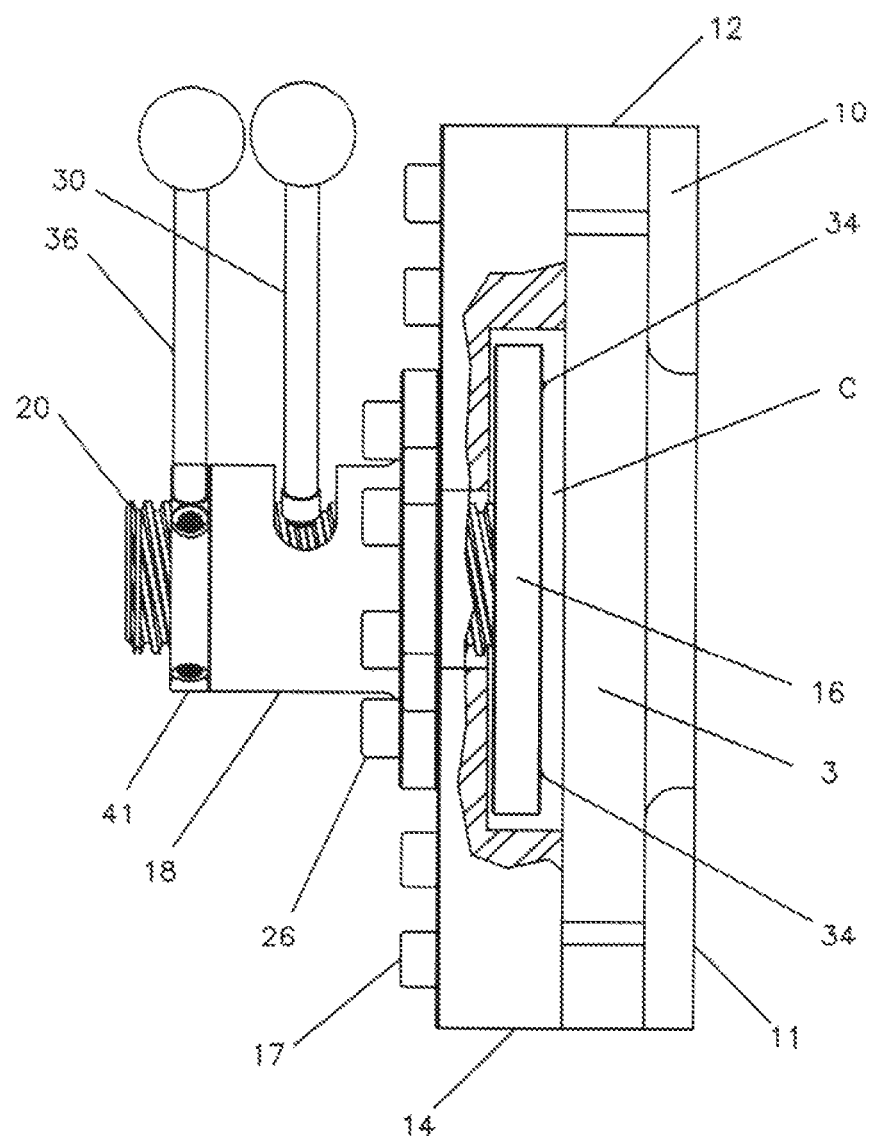
FIG. 14 is a side view similar to that of FIG. 5 hereof but showing blind flange 16 retracted into cavity C.

FIG. 14 hereof is a view of similar to that shown in FIG. 5 but showing another preferred embodiment of the present invention which is the use a cavity C manufactured into back face of circular front plate 14 for protect blind flange 16 when retracted.

FIG. 15 hereof is view similar to that of FIG. 14 hereof but showing pipe 40 with flange 38 pressed against blind flange 16.

FIG. 16 hereof is a representation of a single forged, cast, machined, or extruded unit comprised of the three integral sections, the slotted rear plate-like section 10, slotted spacer section 12, and front plate section 14. Because the apparatus of FIGS. 9 and 10 hereof are the three sections manufactured from a single piece of material and comprising the three sections are numbered 110, 120, and 140. Holes 100 are provided to accept bolts used to secure actuator 54 to front face to circular front section 14. The unit represented in this FIG. 16 can be made of any suitable material, similar to the materials early described for the testing apparatus have three separate sections joined together by a suitable means.

Figure 17:
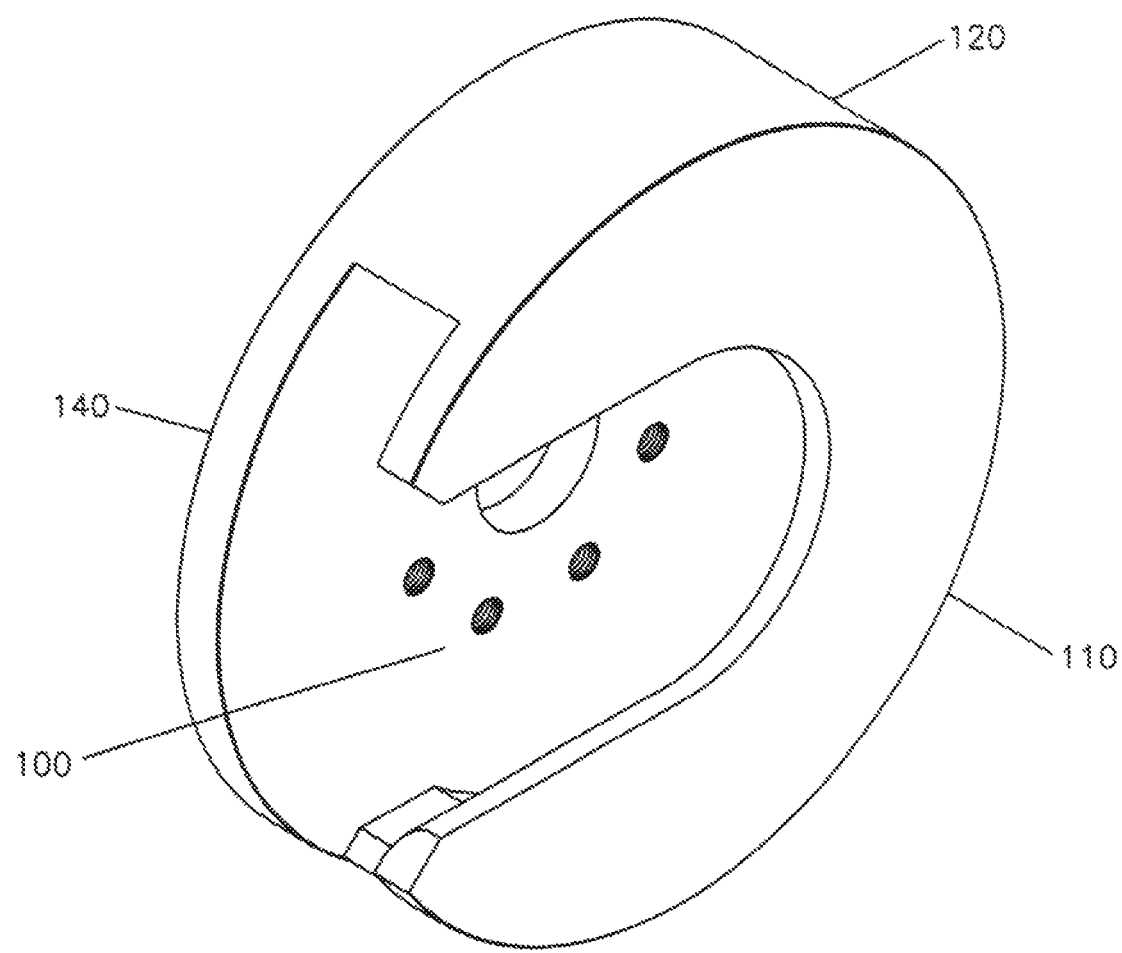
FIG. 17 hereof is an elevated view of the rear face of a preferred embodiment 120 of the apparatus of the present invention wherein the front section, the middle section, and the rear sections are also not individual component parts secured together, but are sections, or areas, of a single unitary piece that is manufactured by a method such as forging, casting, extruding or machining.

FIG. 17 hereof illustrates the opposite face of that illustrated in FIG. 16 hereof, which is a single unit construction containing three sections 110 (rear slotted section), 120 (spacer section) and 140 (front plate section) which of course corresponds to the individual parts of early Figures hereof. Annular opening 90 is shown for receiving activator rod 2, as well as showing treaded holes 100 for receiving corresponding threaded bolts.

Figure 18:
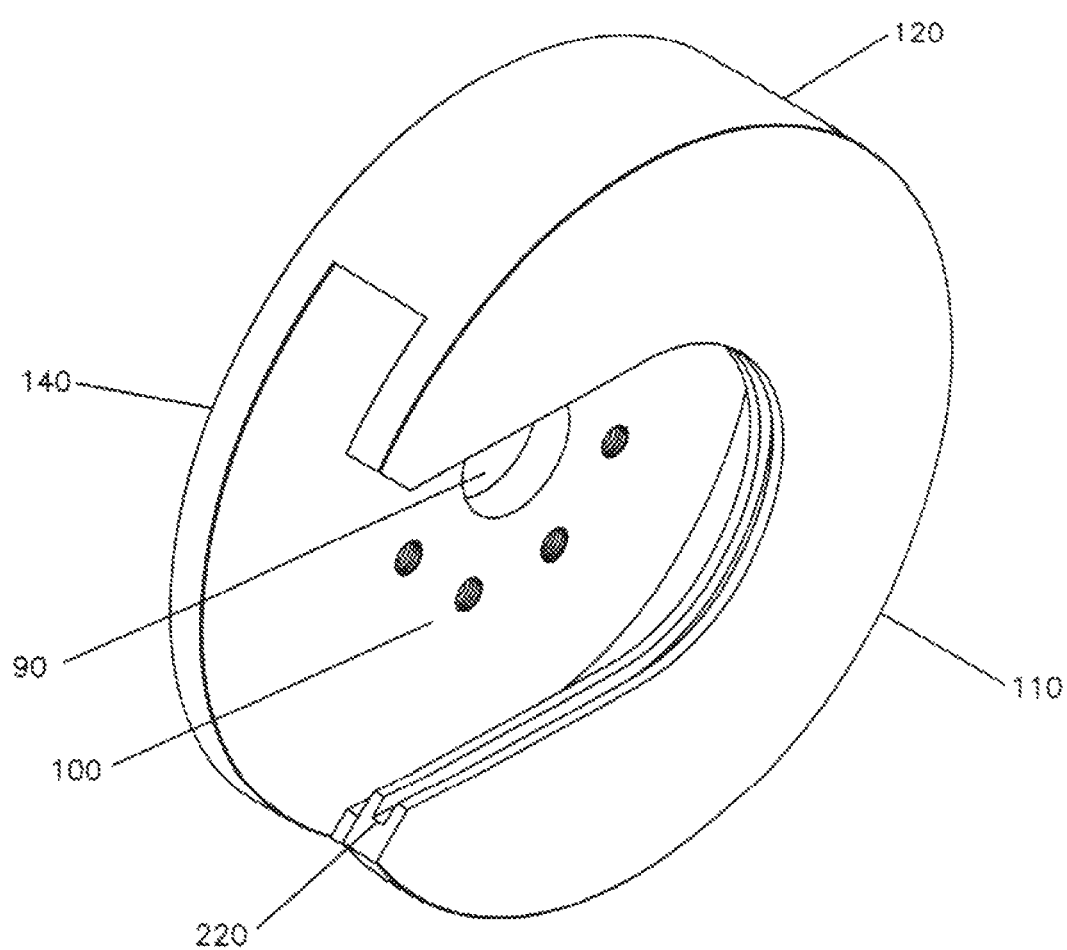
FIG. 18 hereof is a similar view as shown in FIG. 17 hereof, but showing groove 220 for accepting tongue 210 of adapter plate 200 shown in FIGS. 9A and 9B hereof.

FIG. 18 hereof is a view similar to the view shown in FIG. 2 hereof, but showing a groove 220 along the edge of back plate section forming the U-shape for receiving an adapter 200 such as that shown in FIGS. 9 and 10 hereof.

Figure 19:
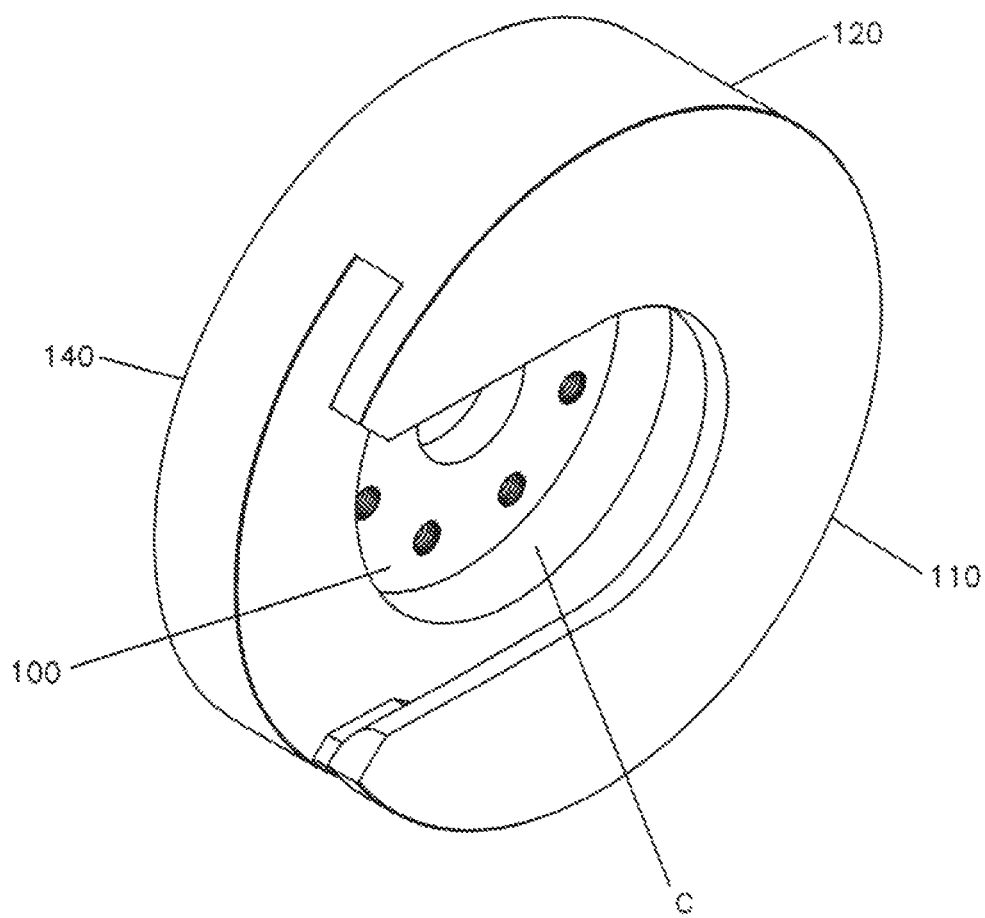
FIG. 19 hereof is an elevated view, similar to that of FIG. 18 hereof, but showing Cavity C recessed into the back surface of front circular plate 14. Cavity C can be recessed into the back surface of circular front plate section 14 by any suitable method. Non-limiting examples of such methods include machining, molding, and forging. Cavity C protects blind flange 16 when retracted.

FIG. 19 hereof is a view of the single unitary structure 120 illustrated in FIG. 16 hereof, but showing circular cavity C provided into the center of circular front section 140.

The present invention is particularly directed to obtaining power from a remotely operated vehicle to activate said actuator to advance and retract said blind flange against the flange of a flanged item to be tested. As previously stated above, the actuator means can include forces such as manual, hydraulic, pneumatic, electrical as well as magnetic. In a preferred embodiment, the force providing power to move said blind flange is gotten from a remotely operated vehicle (ROV) operated under a body of water, as well as an unmanned ground vehicle (UGV) which can be remotely operated above or below ground. Such vehicles, both underwater types as well as the above or below the ground type, are well known in the art and thus a detailed discussion of them is now needed in this application. Any type of suitable ground or underground vehicle can be used in the practice of the present invention which are of the remotely operated type, of the autonomous type, or the semi-autonomous type Subsea architecture of gas and oil well systems are typically comprised of PLET (Pipeline End Termination) structures and PLEM (Pipeline End Manifolds) structures, FLET (Flow Line End Termination) structures, as well as associated flowlines, risers, and pipelines. A PLET structure typically refers to a system of pipe spools, valving (including emergency shutdown valves), flanges, instruments, and Subsea Umbilical Termination Unit (SUTA) used to terminate a single flowline to a riser that allows the fluids or gas to be conducted to a nearby platform facility for processing, or simply, a pipeline that goes ashore for processing or storage. The term "fluids" as used herein refers primarily to liquids of various viscosities, gas, or mixed phase gas/liquids, but typically not slurries. A PLEM structure is typically a pipeline End Manifold also comprising of pipe spools, valving (including emergency shutdown valves), flanges, instruments, and Subsea Umbilical Termination Unit (SUTA) where two or more flowlines combined into a single, or multiple, lines associated with a nearby production platform. It can also connect flowlines to one or more pipelines ashore. Further, a FLET is typically installed at the end of flexible flowline to enable and ROV (Remote Operated Vehicle) functions, venting functionality, as well as pressure control.

The valves on a PLET, PLEM, or FLET are typically powered hydraulically from a Hydraulic Power Unit (HPLC) on a topside facility through an umbilical. The umbilical also typically contains electrical power and instrumentation wires for control and supervision, and also flow assurance chemical injection tubing as well. The injection chemicals are typically corrosion inhibitors, paraffin inhibitors, asphaltene inhibitors, demulsifier, biocides, and methanol for hydrate inhibition, etc.

There is usually a Subsea Umbilical Termination Assembly (SUTA) and a Topside's Umbilical Termination Assembly (TUTA). Therefore, high pressure hydraulics is available in the event an ROV is not available. However, in new field developments and when topside hydraulic power systems may be shut in, ROV hydraulic power can be used.

Figure 3:
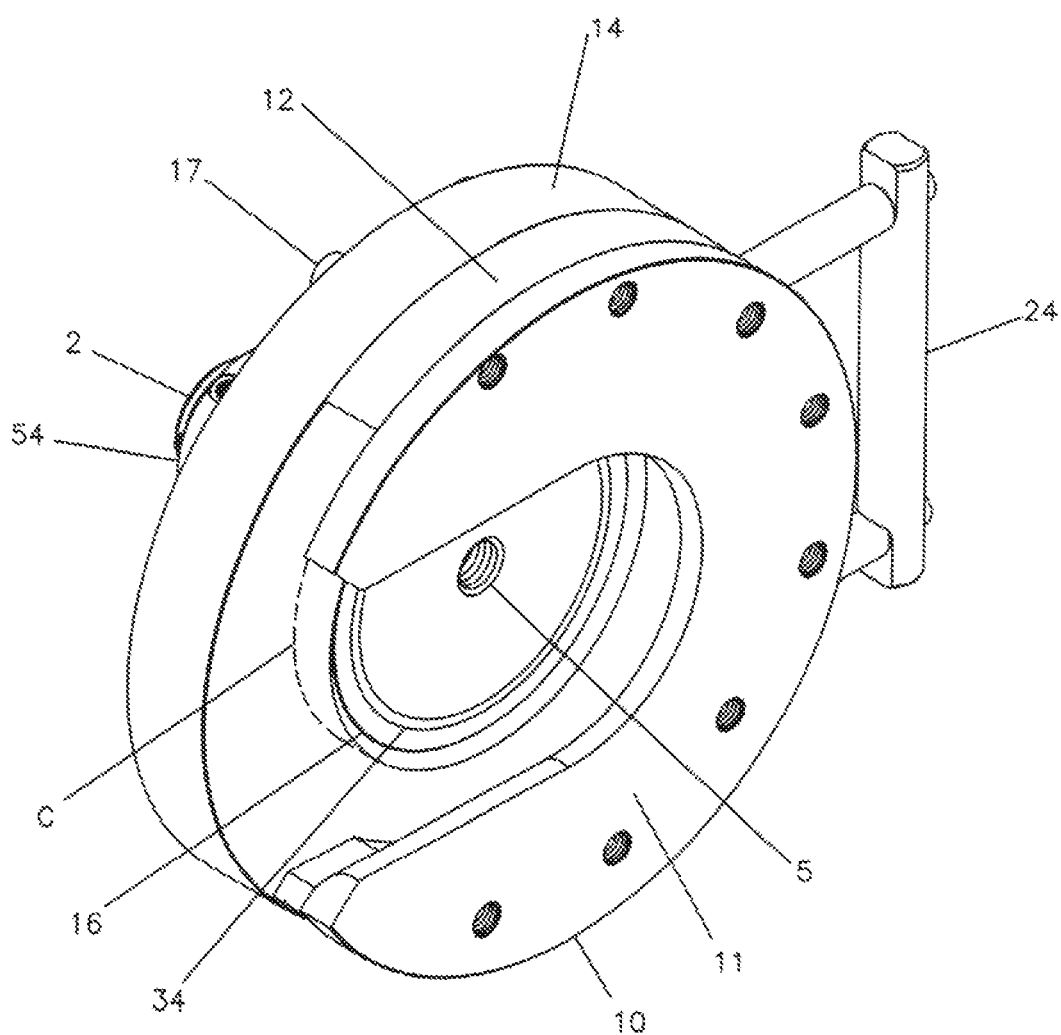
FIG. 3 hereof is an elevated perspective view of the rear face of a preferred embodiment similar to that illustrated in FIG. 3 hereof but showing by dashed lines, cavity C which is set into the rear face of said circular front plate section, which cavity C is of a depth and diameter capable of receiving and protecting blind flange 16 when it is retracted.
Figure 20:
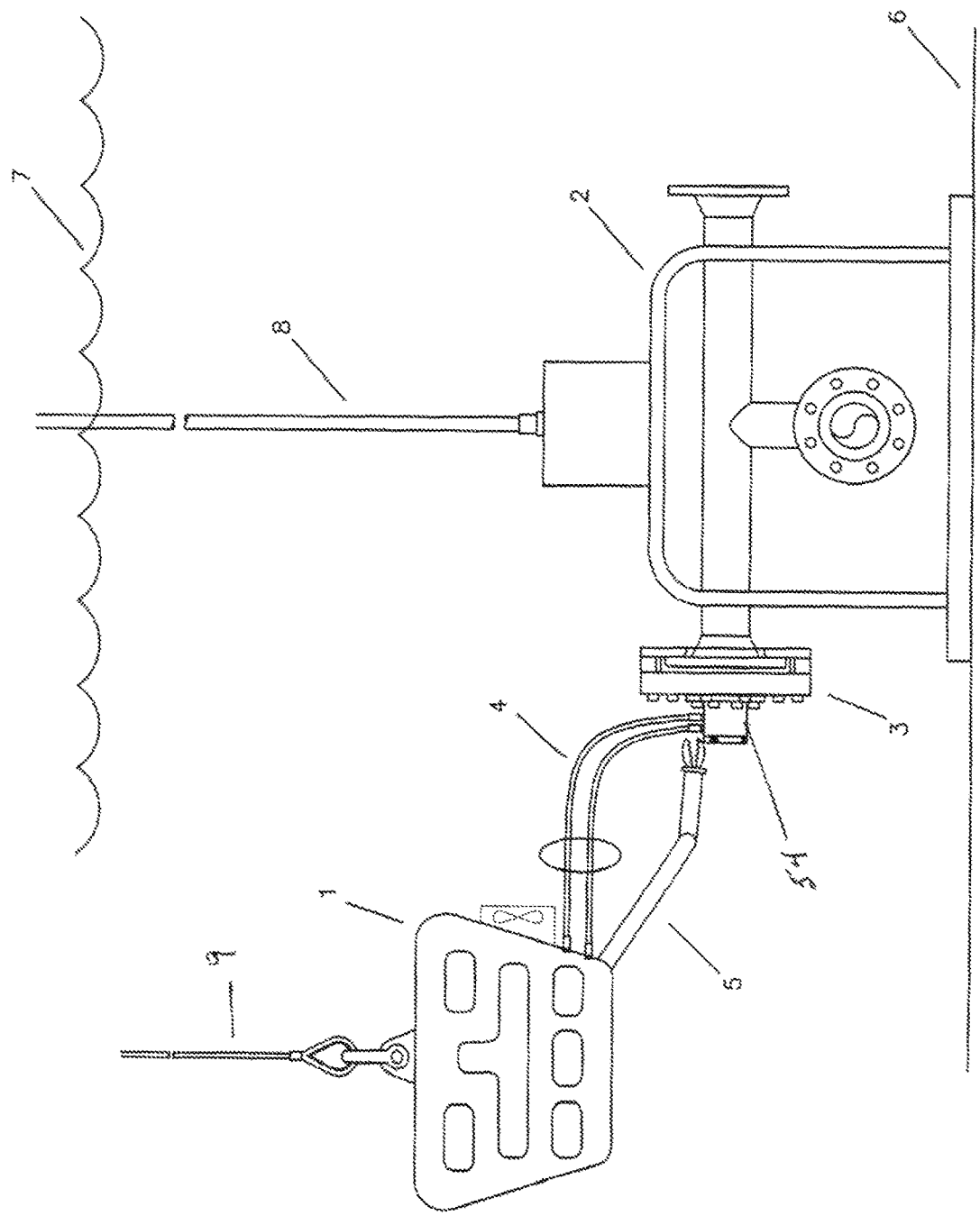
FIG. 20 hereof is a representation of a remotely operated vehicle (ROV) 1 positioned next to a subsea pipeline structure 2 that rests on seafloor 6. Such structures, which are discussed in more detail herein, include Pipeline End Termination (PLET) structures, Pipeline End Manifold (PLEM) structures, and Flow Line End Termination (FLET) structures. Such structures are well known in the art and this FIG. 20 are presented to represent one such structure, although all such structures will typically contain at least one flanged opening, such as at the end of a pipeline section. One or more of the flanges on such structures will need to have secured thereto a blind flange or for to have hydrotesting performed, or both. The hydrotesting apparatus 3 of present invention can share hydraulics with ROV 1 containing a hydraulic system via lines 4 or with subsea structure 2 which will typically include both hydraulic and electrical power. Actuator 54 can receive power from either ROV 1 or subsea structure 2.

Newly added FIG. 20 is a relatively simple representation of a remotely operated vehicle (ROV) 1 suspended undersea via cable 9, which ROV 1 is assisting the attaching the hydrotesting apparatus 3 to a flange located on a subsea structure 2 which rest on a seabed 6. The ROV has a robotic arm 5 that can help in positioning the hydrotesting apparatus in place. Hydraulic lines 4 are used to pass hydraulic fluid back and forth between the ROV and the actuator 54 which is also shown in FIGS. 3 and 4 hereof. This FIG. 20 also shows umbilical cable 8 which is well known in the art for providing various services, such as electrical power to an to a subsea structure or to ROV for subsea work. The surface of the sea is represented by 7. It will be noted that instead of cable 9 used to suspend said ROV underwater, cable 9 can also be an umbilical cable used to provide various services to the ROV.

What is claimed is:

1. Apparatus for sealing a flanged opening of a flanged item located under a body of water, which apparatus is comprised of:
   I) a remotely operated vehicle located below the surface of a body of water, which remotely operated vehicle comprises at least one power system, one of which is a hydraulic system, which remotely operated vehicle is at the vicinity of a subsea structure having a flanged opening to which a blind flange is to be positioned, or hydrotesting performed, wherein said flanged opening is associated with a subsea structure used in the oil and gas industry;
   II) a hydrotesting apparatus containing a blind flange comprising:
      a) a circular rear plate section having an elongated U-shaped slot forming an opening and giving said rear circular plate a C-shape, which elongated slot is capable of receiving a flange of a flanged opening to be sealed;
      b) a front circular plate section having a front face and a rear face and having a through-hole at its center for receiving an elongated hollow shaft capable of longitudinal movement;
      c) an elongated hollow shaft extending through said through-hole of said front circular plate section, said elongated hollow shaft having a first end and a second end which first end extends through said through-hole of said front circular plate section,
      d) a blind flange having a first face and a second face which second face is secured at its center to said first end of said elongated hollow shaft extending through said through-hole of said front plate section;
      e) a C-shaped middle section having a slot for receiving the flange of said flanged opening to be sealed, which middle section is located between and connected to said circular rear plate section and said front circular plate section which provides a space between said rear plate section and said front circular plate section and capable of receiving a flange of the flanged opening to be sealed and for receiving said blind flange and having sufficient room for horizontal movement of said blind flange in and out of contact with the flange of the flanged opening to be sealed; and
      f) an actuator secured to said front face of said front circular plate section, which actuator is capable, when activated, of horizontally moving said elongated shaft and blind flange so that said blind flange can be moved in and out of contact with the flange of the flanged opening to be sealed.

2. The hydrostatic testing apparatus of claim 1 wherein said slot of said circular rear plate of said testing apparatus contains an inner edge surface containing a groove along its surface for receiving a removable U-shaped adapter plate having a matching tongue along its outer edge surface.

3. The hydrostatic testing apparatus of claim 1 wherein said testing apparatus is provided with a U-shaped adapter plate or projection for being positioned in said groove of said circular rear plate section.

4. The hydrostatic testing apparatus of claim 1 wherein said front circular section of said testing apparatus also contains, at its center, a circular cavity having a diameter and depth capable of receiving said blind flange of said testing apparatus.

5. The hydrostatic testing apparatus of claim 1 which is provided with an annular sealing material embedded into the face of said blind flange, wherein the diameter of said annular shaped sealing material is greater than the diameter of said opening to be sealed but smaller than the diameter of said blind flange.

6. The hydrostatic testing apparatus of claim 1 wherein said rear plate section, said front circular section and said middle section of said testing apparatus are separate sections secured together by a securing means.

7. The hydrostatic testing apparatus of claim 1 wherein said rear section, said front circular section and said middle section of said testing apparatus are manufactured as a single unitary item.

8. The hydrostatic testing apparatus of claim 7 wherein said unitary item is manufactured by a process including forging, casting, or machining.

9. The hydrostatic apparatus of claim 1 wherein the shaft and blind flange of said testing apparatus are operated by an actuator.

10. The hydrostatic testing apparatus of claim 9 wherein the actuator of said testing apparatus is powered manually, pneumatically, hydraulically, magnetically, or electromagnetically.

11. The hydrostatic testing apparatus of claim 10 wherein said actuator is powered by the hydraulic system of a remotely operated vehicle containing a hydraulic system.

12. The hydrostatic testing apparatus of claim 1 said which is provided with hydrostatic testing equipment fluidly secured to said elongated shaft.

13. The hydrostatic testing apparatus of claim 1 wherein said rear section, said front circular section and said middle section of said testing apparatus are manufactured as a single unitary item.

14. The apparatus of claim 1 wherein the subsea structure having a flanged opening to which a blind flange is to be positioned is a pipeline termination (PLET) structure.

15. The apparatus of claim 1 wherein the subsea structure having a flanged opening to which a blind flange is to be positioned is a pipeline end termination manifold (PLEM).

16. The apparatus of claim 1 wherein the subsea structure having a flanged opening to which a blind flange is to be positioned is a flowline end termination (FLET) structure.

* * * * *